(12) United States Patent
Bloom

(10) Patent No.: US 6,237,370 B1
(45) Date of Patent: May 29, 2001

(54) APPARATUS FOR AUTOMATED PRODUCTION, AND/OR PACKAGING AND/OR TESTING OF FIBER OPTIC DEVICES INCLUDING OPTICAL FIBER SYSTEM COMPONENTS AND OPTICAL FIBERS

(76) Inventor: Cary Bloom, 5272 River Rd., Bethesda, MD (US) 20816

( * ) Notice: Subject to any disclaimer, the term of this patent is extended or adjusted under 35 U.S.C. 154(b) by 0 days.

(21) Appl. No.: 09/137,700

(22) Filed: Aug. 21, 1998

Related U.S. Application Data

(60) Division of application No. 08/898,730, filed on Jul. 22, 1997, now Pat. No. 6,003,341, which is a continuation-in-part of application No. 08/763,122, filed on Dec. 10, 1996, now Pat. No. 5,871,559.
(60) Provisional application No. 60/040,875, filed on Mar. 21, 1997.

(51) Int. Cl.[7] .................................................. C03B 37/07
(52) U.S. Cl. ............................. 65/484; 65/501; 65/485; 65/406; 65/408; 65/411
(58) Field of Search ...................... 65/406, 407, 408, 65/409, 410, 411, 412, 501, 484, 485

(56) References Cited

U.S. PATENT DOCUMENTS

| | | |
|---|---|---|
| Re. 33,296 | 8/1990 | Stowe et al. . |
| Re. 34,955 | 5/1995 | Anton et al. . |
| 3,854,003 | 12/1974 | Duret . |

(List continued on next page.)

FOREIGN PATENT DOCUMENTS

| | | |
|---|---|---|
| 0 293 289 | 11/1985 | (GB) . |
| 0 215 668 | 3/1987 | (GB) . |
| 0 411 956 | 2/1991 | (GB) . |
| 2 235 043 | 2/1991 | (GB) . |
| 58-123513 | 7/1983 | (JP) . |
| 07012680 | 1/1995 | (JP) . |
| 07083795 | 3/1995 | (JP) . |
| WO 87/00934 | 2/1987 | (WO) . |
| WO 97/11917 | 4/1997 | (WO) . |

OTHER PUBLICATIONS

"Construction of An Automated Fiber Pigtailing Machine for Optoelectronic Components" Uniphase Telecommunications Products, Bloomfield, CT (Apr., 1997).
Pocha et al. "Thermal Study of Silicon Optical Microbenches With On Board Heaters for Soldering" Optical Society of America, Topical Meeting on Integrated Photonics Research, Boston, MA Apr. 29–May 3, 1996. (Jan., 1996).
Strand, Oliver T. "Construction of an Automated Fiber Pigtailing Machine" Government Microcircuit Applications Conference, Orlando, FL Mar. 19–21, 1996. (Jan. 1996).

(List continued on next page.)

*Primary Examiner*—John Hoffmann
(74) *Attorney, Agent, or Firm*—Irah H. Donner; Hale and Dorr LLP

(57) ABSTRACT

A system for automated production of a fiber optic device includes a chamber regulating an environment and/or atmosphere within for the automated production of the fiber optic device. The system also includes a sealable input port, communicating with the chamber and substantially sealing the environment and the atmosphere of the chamber. The sealable input port receives an optical fiber for insertion therethrough into the chamber. A movable holding stage is included within the chamber, including at least one clamp to be secured to the optical fiber. An energy source is disposed within the chamber, and used to apply energy to the optical fiber. The system also includes a gripping device within the chamber. The gripping device includes a cavity adapted for receiving the optical fiber therethrough and for securing thereto. The gripping device is also adapted to transport the optical fiber from the sealable input port to the movable holding stage and to a predetermined position to receive the energy applied by the energy source.

9 Claims, 23 Drawing Sheets

U.S. PATENT DOCUMENTS

| | | |
|---|---|---|
| 3,960,631 | 6/1976 | Kohanzadeh et al. ............... 65/4 B |
| 4,026,632 | 5/1977 | Hill et al. . |
| 4,336,047 | 6/1982 | Pavlopoulos et al. . |
| 4,611,884 | 9/1986 | Roberts . |
| 4,699,453 | 10/1987 | Roberts . |
| 4,701,010 | 10/1987 | Roberts . |
| 4,714,316 | 12/1987 | Moore et al. . |
| 4,763,977 | 8/1988 | Kawasaki et al. . |
| 4,772,085 | 9/1988 | Moore et al. . |
| 4,779,945 | 10/1988 | Hill et al. . |
| 4,792,203 | 12/1988 | Nelson et al. . |
| 4,798,438 | 1/1989 | Moore et al. . |
| 4,834,481 | 5/1989 | Lawson et al. . |
| 4,895,423 | 1/1990 | Bilodeau et al. . |
| 4,900,119 | 2/1990 | Hill et al. . |
| 4,906,068 | 3/1990 | Olson et al. . |
| 4,916,811 | 4/1990 | Uehara et al. . |
| 4,923,273 | 5/1990 | Taylor . |
| 4,957,338 | 9/1990 | Thorncraft et al. . |
| 4,995,688 | 2/1991 | Anton et al. . |
| 4,997,243 | 3/1991 | Aiki et al. . |
| 4,997,245 | 3/1991 | DuPay et al. . |
| 4,997,247 | 3/1991 | Stowe . |
| 4,997,248 | 3/1991 | Stowe . |
| 4,997,252 | 3/1991 | Sugawara et al. . |
| 4,997,253 | 3/1991 | Enochs . |
| 5,011,251 | 4/1991 | Miller et al. . |
| 5,013,117 | 5/1991 | Fukuma . |
| 5,013,121 | 5/1991 | Anton et al. . |
| 5,028,110 | 7/1991 | Plummer . |
| 5,031,994 | 7/1991 | Emmons . |
| 5,037,176 | 8/1991 | Roberts et al. . |
| 5,066,149 | 11/1991 | Wheeler et al. . |
| 5,067,678 | 11/1991 | Henneberger et al. . |
| 5,093,885 | 3/1992 | Anton . |
| 5,121,453 | 6/1992 | Orazi et al. . |
| 5,123,219 | 6/1992 | Beard et al. . |
| 5,136,121 | 8/1992 | Kluska et al. . |
| 5,141,378 | 8/1992 | Lestournel et al. ................ 414/8 |
| 5,149,350 | 9/1992 | Itoh et al. ................ 65/12 |
| 5,157,751 | 10/1992 | Maas et al. . |
| 5,159,655 | 10/1992 | Ziebol et al. . |
| 5,166,992 | 11/1992 | Cassidy et al. . |
| 5,166,994 | 11/1992 | Stowe et al. . |
| 5,168,617 | 12/1992 | Tsuchida et al. ................ 29/281.1 |
| 5,179,608 | 1/1993 | Ziebol et al. . |
| 5,179,618 | 1/1993 | Anton . |
| 5,189,723 | 2/1993 | Johnson et al. . |
| 5,208,894 | 5/1993 | Johnson et al. . |
| 5,208,977 | 5/1993 | Ricard . |
| 5,214,732 | 5/1993 | Beard et al. . |
| 5,214,735 | 5/1993 | Henneberger et al. . |
| 5,222,176 | 6/1993 | Webber et al. . |
| 5,239,604 | 8/1993 | Ziebol et al. . |
| 5,240,489 | 8/1993 | Robson . |
| 5,251,002 | 10/1993 | Gryk . |
| 5,261,019 | 11/1993 | Beard et al. . |
| 5,274,731 | 12/1993 | White . |
| 5,283,852 | 2/1994 | Gibler et al. . |
| 5,288,301 | 2/1994 | Rowe et al. ................ 65/4.2 |
| 5,293,440 | 3/1994 | Miles et al. . |
| 5,293,582 | 3/1994 | Beard et al. . |
| 5,305,405 | 4/1994 | Emmons et al. . |
| 5,316,243 | 5/1994 | Henneberger . |
| 5,317,663 | 5/1994 | Beard et al. . |
| 5,319,728 | 6/1994 | Lu et al. . |
| 5,319,733 | 6/1994 | Emmons et al. . |
| 5,329,600 | 7/1994 | Sasaoka et al. . |
| 5,343,544 | 8/1994 | Boyd et al. . |
| 5,355,426 | 10/1994 | Daniel et al. . |
| 5,363,465 | 11/1994 | Korkowski et al. . |
| 5,367,591 | 11/1994 | Seike et al. . |
| 5,381,497 | 1/1995 | Toland et al. . |
| 5,386,484 | 1/1995 | Ooka et al. . |
| 5,386,488 | 1/1995 | Oikawa . |
| 5,386,490 | 1/1995 | Pan et al. . |
| 5,395,101 | 3/1995 | Takimoto et al. . |
| 5,422,969 | 6/1995 | Eno . |
| 5,432,875 | 7/1995 | Korkowski et al. . |
| 5,445,319 | 8/1995 | Pan et al. . |
| 5,459,598 | 10/1995 | Carrington . |
| 5,463,704 | 10/1995 | Ziebol . |
| 5,474,780 | 12/1995 | Mizrahi . |
| 5,475,782 | 12/1995 | Ziebol . |
| 5,475,784 | 12/1995 | Bookbinder et al. . |
| 5,497,444 | 3/1996 | Wheeler . |
| 5,577,149 | 11/1996 | Averbeck et al. . |
| 5,588,087 | 12/1996 | Emmons et al. . |
| 5,602,952 | 2/1997 | Rashleigh et al. . |

OTHER PUBLICATIONS

Dowling, Peter "From Glass to Optical Fiber: Optical–fiber manufacturing requires special processes and controlled quality." *Lightwave* (Feb., 1998).

"Silicon Microbench Technology" Lawrence Livermore National Laboratory http://www–phys.llnl.gov/H Div/photonics/simicrobench.html (Apr. 16, 1998).

"Automated Optoelectronic Packaging" Lawrence Livermore National Laboratory http://www–phys.llnl.gov/H Div/photonics/AFPM.html (Apr. 16, 1998).

"Automated Optoelectronic Packaging" Lawrence Livermore National Laboratory http://www–phys.llnl.gov/automation–robotics/aoep.html (Apr. 16, 1998).

"Micro Assembly Automation" Lawrence Livermore National Laboratory http://www.llnl.gov/automation–robotics/maa.html (Apr. 16, 1998).

"Micorassembly Automation Laboratory" Lawrence Livermore National Laboratory http://www.llnl.gov/eng/ee/erd/maal/maalhome.html (Apr. 16, 1998).

Heyler, Randy, Newport Corp. "Automation Boosts Low- -Cost Fiber Pigtailing" *Photonics Spectra* Jan., 1997 http://www.laurin.com/Content/Jan97/repAuto.html (Apr. 16, 1998).

Heyler, Randy (Newport Corp.) "Take the Guesswork Out of Planar Optics Pigtailing" *Lightwave* (Feb., 1998) pp. 76–80.

Dormer, James F. (Lucent Technologies) "OSA Manufacture Moves Into the Future" *Lightwave* (Feb., 1998) pp. 82–85.

Heyler, Randy (Newport Corp.) "WDM Component Packaging & Automated Assembly Technology" *Fiberoptic Product News* (Apr., 1998) pp. 25–32.

"Control of Optical Fibre Taper Shape", Electronics Letters, vol. 27, No. 18, Aug. 29, 1991, pp. 1654–56.

"Loss and Spectral Control in Fused Tapered Couplers", by K.P. Oakley et al., Optical Engineering, vol. 33, No. 12, Dec. 1994, pp. 4006–4019.

"The Shape of Fiber Tapers", by T.A. Birks et al., Journal of Lightwave Technology, IEEE, vol. 10, No. 4, Apr. 1992, pp. 432–438.

"Tapered Optical Fiber Components and Sensors", by L.C. Bobb, et al., Microwave Journal, May 1992.

"Automated Fabrication of Fused Fibre Optic Couplers", by Robert Frank Swain, dissertation, Heriot–Watt University, Edinburgh, Ireland (1993).

"Fibre–optic Coupler Fabrication at AOFR", by A.J. Stevenson et al., International Journal of Optoelectronics, vol. 6, Nos. 1/2, 1991, pp. 127–144.

"Fiber–Coupler Fabrication with Automatic Fusion–Elongation Processes for Low Excess Loss and High Coupling–Ratio Accuracy", by I. Yokohama, et al., Journal of Lightwave Technology, IEEE, vol. LT–5, No. 7, Jul. 1987.

"Premise Wiring Communication Fiber Optics", FIS, 1997 15th Edition. No Date.

Schleuniger, "Schleuniger PF 1000/PF2000", Electric Demand Prefeeders. No Date.

Schleunige, "CP 1200 Coiling Unit".

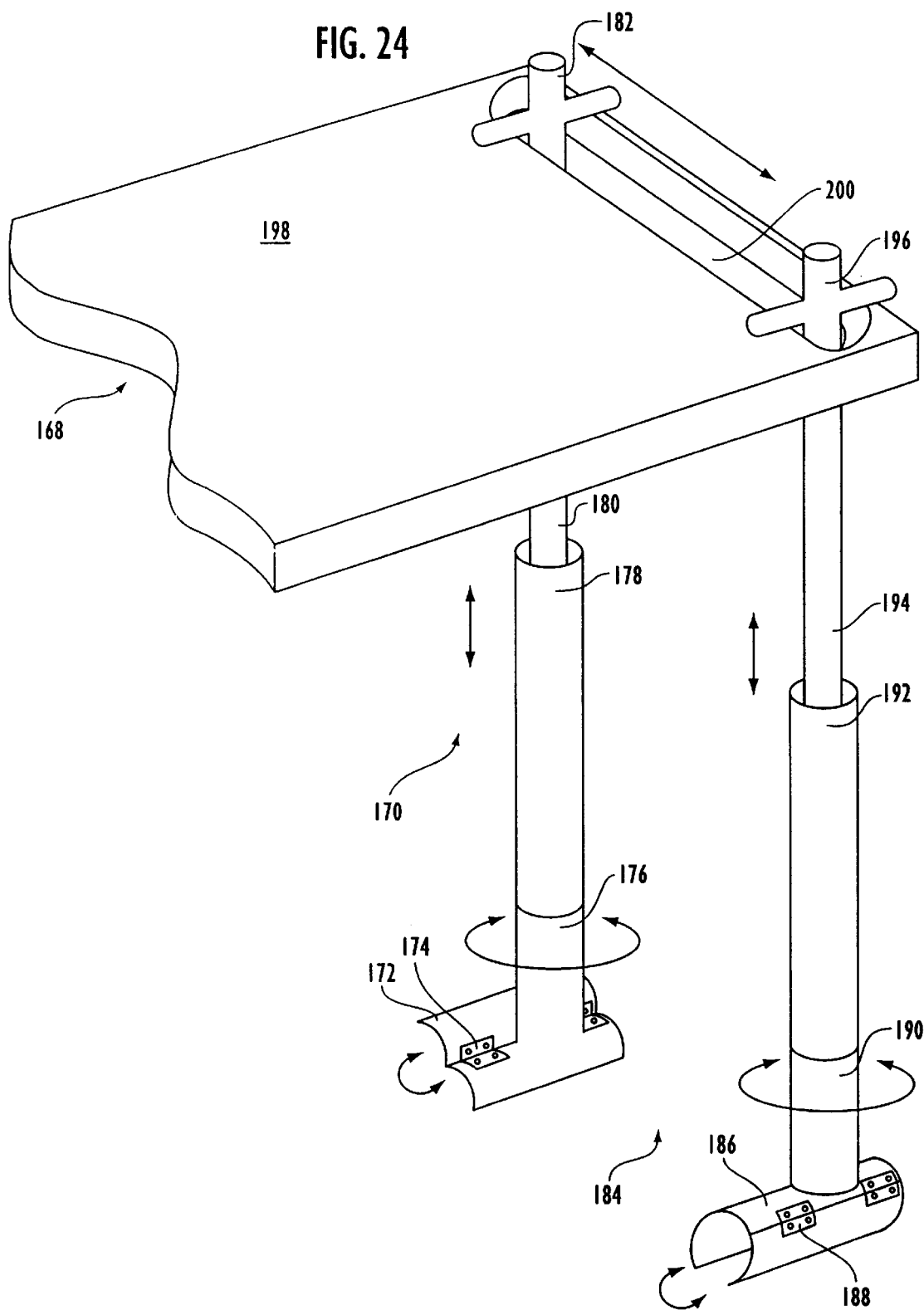

APPARATUS FOR AUTOMATED PRODUCTION, AND/OR PACKAGING AND/OR TESTING OF FIBER OPTIC DEVICES INCLUDING OPTICAL FIBER SYSTEM COMPONENTS AND OPTICAL FIBERS

RELATED APPLICATIONS

This application is a divisional application from U.S. application Ser. No. 08/898,730 filed Jul. 22, 1997 now U.S. Pat. No. 6,003,341 which is a continuation-in-part application of U.S. application Ser. No. 08/763,122 filed Dec. 10, 1996, now U.S. Pat. No. 5,871,559 and which claims priority to U.S. provisional application Ser. No. 60/040,875 filed Mar. 21, 1997.

This application is related to U.S. application Ser. No. 08/679,059, filed on Jul. 12, 1996, now U.S. Pat. No. 5,838,652 U.S. application Ser. No. 08/718,727, filed on Sep. 24, 1996, abandoned, U.S. application Ser. No. 08/725,651, filed on Oct. 1, 1996, U.S. application Ser. No. 08/763,052, filed on Dec. 10, 1996, U.S. application Ser. No. 08/763,125, filed on Dec. 10, 1996, U.S. application Ser. No. 08/833,119, entitled "APPARATUS AND METHOD FOR CONTROLLED HEATING AND DEFORMING OF AN OPTIC FIBER," filed on Apr. 14, 1997, U.S. application Ser. No. 08/866,385, entitled "APPARATUS AND METHOD BONDING OPTICAL FIBER AND/OR DEVICE TO EXTERNAL ELEMENT USING COMPLIANT MATERIAL INTERFACE," filed on May 30, 1997 now U.S. Pat. No. 5,971,629, Ser. No. 08/880,073, entitled "APPARATUS FOR, AND METHOD OF, FORMING A LOW STRESS TIGHT FIT OF AN OPTICAL FIBER TO AN EXTERNAL ELEMENT," filed on Jun. 20, 1997, U.S. application Ser. No. 08/884,665, now U.S. Pat. No. 5,918,522 entitled "APPARATUS AND METHOD FOR TESTING OPTICAL FIBER SYSTEM COMPONENTS," filed on Jun. 27, 1997, U.S. application Ser. No. 08/885,034, entitled "APPARATUS FOR, AND METHOD OF, FORMING A LOW STRESS TIGHT FIT OF AN OPTICAL FIBER TO AN EXTERNAL ELEMENT," filed on Jun. 30, 1997, 2986-004B), now U.S. Pat. No. 5,917,975 all of which are incorporated herein by reference.

BACKGROUND OF THE INVENTION

1. Field of the Invention

The present invention relates to an apparatus for, and method of, automated production, and/or packaging and/or testing of fiber optic devices including optical fiber system components and optical fibers, and more particularly, to an apparatus for, and method of, automatically manufacturing/forming, packaging and testing fiber optic devices in a rapid, accurate, repeatable, and reliable manner.

2. Background of the Related Art

Currently, a limited amount of effort and/or development and/or progress has been made in the area of automating the production process of fiber optic devices. For example, in *Robert Frank Swain*, "Automated Fabrication of Fused Fibre Optic Couplers," a dissertation published by the Heriot-Watt University, Edinburgh, Ireland (1993), submitted in U.S. application Ser. No. 08/898,730, filed Jul. 22, 1997 and incorporated by reference herein (hereinafter "dissertation"), one example of an automated production facility is proposed, illustrated in FIG. 1. The production facility is designed for the manufacture of fused biconical tapered (FBT) devices that are manufactured by removing the plastic buffer coating then twisting a number of fibers together. The fibers are then heated using an oxy-hydrogen flame or furnace, which when soft, fuse together and are drawn axially using stepper motor stages.

The apparatus in FIG. 1 has a twin reel fibre tensioning and metering unit 4 with the facility to mount either lasers or detectors directly to the reel. Electrical signals are taken back to the control system via slip rings mounted on the back of the fiber reels. This unit 4 allows fibers 2 to be drawn directly from the reel to the working zone of the apparatus. Unit 4, as admitted by the dissertation, is a preliminary design that has yet to be integrated fully in the apparatus.

The automatic fiber twisting mechanism 6 works by lapping the fibers over one another using a rotary chuck. Axial twisting is limited by the micro-ball bearing assemblies through which the fibers pass. The twisting mechanism is operated by a stepper motor driver under computer control within the operating sequence. The twisted fibers have to be clamped side by side and held in intimate contact so that when heated to a sufficiently high temperature, the fibers will fuse together.

An automated fiber buffer stripper 8 uses a combination of heat and vacuum to evaporate the plastic buffer material from the fiber. This technique is used as a method for recycling acrylic polymers in the plastics industry. The fiber clamp 10 consists of a soft silicone rubber pad that traps the fiber between itself and the flat metal backplate. The force applied to the fiber is normal to the metal back plate. The fusion and drawing module includes the means by which the fibers are heated. The furnace 14 must be positioned correctly about the fibers to be fused together.

The furnace is essentially a resistance heater with 11 individual elements operating in an argon atmosphere, under computer control. Computer control of the furnace takes the form of an 11 element proportional, integral, differential (PID) controller which continually adjusts individual element supply power to suit the furnace loading and set point temperature.

When the fibers are softened, they begin to fuse, and at this point an axial force must be applied to the fibers to elongate them. This drawing operation is achieved by a stepper motor stage that incorporates the fiber clamping system. Due to the way in which the rig is designed, only one side of the coupler is drawn via moving fiber clamp 12. The stepper motor draw table is mounted onto an air bearing which is in turn restrained by a proving ring. With the air bearing floating, the axial tension in the fibers is registered. The output from the strain gauge is fed back to the computer controller so that temperature and draw rate may be set.

Once the fibers have been drawn into a coupler, the coupler must be "packaged" to provide strength so that the coupler may be handled without breakage. A substrate positioner has a cassette of substrates which can be selected and manoeuvred into position under the coupler prior to manual application of the adhesive used to hold the coupler to the substrate.

Other proposed production facilities include the following publications: U.S. Pat. Nos. 5,386,490; 5,329,600; 5,013,117; Stevenson, et al., "Fibre-Optic Coupler Fabrication at AOFR," International Journal of Optoelectronics, Vol. 6, Nos. 1/2, p. 127 (1991); Yokohama, et al., "Fiber-Coupler Fabrication with Automatic Fusion-Elongation Processes for Low Excess Loss and High Coupling-Ratio Accuracy," Journal of Lightwave Technology, Vol. LT.-5, No. 7, p. 910 (July 1987); Moore, et al., "Mass Production of Fused Couplers and Coupler Based Devices," SPIE Vol. 574, Fibre Optic Couplers, Connectors and Splice Technology II, p. 135 (1985), all of which are hereby incorporated by reference.

However, I have realized that the above processes suffer from various drawbacks and/or disadvantages. For example, the above processes do not generally provide sufficient tools and/or automation to accurately and/or reliably transport or convey a fiber optic device through the production process. In addition, the above processes utilize equipment that is itself complex, and/or makes the production process complex, such that the production process is overly complex, expensive and/or impractical for rapid production of high quality fiber optic devices.

Further, the above processes also rely generally on production and/or manufacturing techniques that do not provide good yield results. For example, the use of epoxy makes the manufacturing process difficult. Similarly, the use of a crimping action can damage a fiber optic device, such as a ferrule and/or optical fiber. Accordingly, an optical fiber and/or fiber optic device produced and/or secured according to these prior techniques often times is not useable.

I have also realized that the above processes are difficult to automate because of the inability of the above processes to adequately design production steps geared and/or designed for an automated process. I have determined that process steps that can be advantageously broken down or separated into the steps of pre-production positioning, production, production monitoring, post-production positioning, testing, packaging, and post-packaging positioning.

I have therefore determined that it is desirable to provide accurate and consistent production of fiber optic devices using a process that is automated.

It is also desirable to provide production techniques to completely automate the manufacture of fiber optic devices.

It is also desirable to provide a production process capable of automatically manufacturing large volumes of fiber optic devices in a rapid, reliable, and inexpensive manner.

It is also desirable to provide a production process capable of at least one or more, and/or a combination of, automated pre-production positioning, production, production monitoring, post-production positioning, testing, packaging, and post-packaging positioning.

SUMMARY OF THE INVENTION

It is a feature and advantage of the present invention to provide rapid, accurate and consistent production of fiber optic devices using a process that is automated.

It is another feature and advantage of the present invention to completely automate the manufacture of fiber optic devices.

It is another feature and advantage of the present invention to provide a production process capable of automatically manufacturing large volumes of high quality fiber optic devices in a rapid, reliable, and inexpensive manner.

It is another feature and advantage of the present invention to provide a production process capable of at least one or more, and/or a combination of, automated pre-production positioning, production, production monitoring, post-production positioning, testing, packaging, and post-packaging positioning.

The present invention substantially and/or completely automates the manufacture of fiber optic devices. The present invention can be used to automate the production of fiber optic devices such as couplers, switches, wave division multiplexers (WDMs), and the like. One principal advantage of the present invention is that it allows large volumes of fiber optic devices to be rapidly, reliably, and inexpensively produced, packaged, and/or tested.

The present invention is based, in part, on the discovery or identification of the problem that the standard fiber optic device production process does not generally provide sufficient tools and/or automation to accurately and/or reliably transport or convey a fiber optic device through the production process. The standard processes utilize equipment that is itself complex, and/or makes the production process complex, such that the production process is overly complex, expensive and/or impractical for rapid production of fiber optic devices. Accordingly, the standard processes do not provide good yield results.

The present invention is also based, in part, on the discovery that the standard processes are difficult to automate because of the inability of the above processes to adequately design production steps geared and/or designed for an automated process. I have discovered process steps that can be advantageously broken down or separated into the steps of pre-production positioning, production monitoring, post-production positioning, testing, packaging, and/or post-packaging positioning. In addition, I have designed an apparatus that functions to accommodate, and/or furnish accurate, reliable and repeatable process control, and more specifically end control and/or loose/unsecure fiber control and/or sectional fiber control, of the fiber optic device that is being produced and/or one or more optical fibers being processed by the present invention.

Advantageously, I have discovered an apparatus that may be used to process and/or manufacture a fiber optic device in a quick, reliable, inexpensive and highly automated manner. Accordingly, fiber optic device production will be greatly increased due to this new apparatus and/or class of techniques described herein.

In addition, I have discovered that the above apparatus and/or techniques may be used for accurate and consistent production of high quality optical fibers, connectors, fiber optic devices, devices, and the like.

According to one embodiment of the invention, a system for automated production of a fiber optic device includes a chamber regulating an environment and/or atmosphere within for the automated production of the fiber optic device. The system also includes a sealable input port, communicating with the chamber and substantially sealing the environment and the atmosphere of the chamber. The sealable input port receives an optical fiber for insertion therethrough into the chamber. A movable holding stage is included within the chamber, including at least one clamp to be secured to the optical fiber. An energy source is disposed within the chamber, and used to apply energy to the optical fiber. The system also includes a gripping device within the chamber. The gripping device includes a cavity adapted for receiving the optical fiber therethrough and for securing thereto. The gripping device is also adapted to transport the optical fiber from the sealable input port to the movable holding stage and to a predetermined position to receive the energy applied by the energy source.

In accordance with another embodiment of the invention, an apparatus for transporting at least one optical fiber throughout the system includes at least one fiber optic device clamp securable to a fiber optic device, and at least one lead clamp securable to a lead of the fiber optic device. The apparatus transports the fiber optic device and the lead to perform, for example, at least one automated production step.

In accordance with another embodiment of the invention, a system for automated connection and testing of a fiber optic device includes a fusion splicing device to automatically fusion splice at least one end of an optical fiber of the fiber optic device. The system also includes a testing device to test optical characteristics of the fiber optic device. The testing device has at least one test lead automatically fusion spliced to the end of the optical fiber using the fusion splicing device. The system also includes a controller responsively connected to and controlling the fusion splicing device and the testing device.

In accordance with another embodiment of the invention, a method for transporting the at least one optical fiber throughout the system includes the step of securing and transporting at least one end of the optical fiber and transporting the optical fiber, under computer control, in the system to a predetermined position to perform the automated production of the fiber optic device, a In accordance with another embodiment of the invention, a method for transporting the at least one optical fiber throughout the system includes the step of securing an end of the optical fiber using at least one gripping device and transporting the end, under computer control, in the system to a predetermined position to perform the automated production of the fiber optic device.

In accordance with another embodiment of the invention, an apparatus for transporting an optical fiber throughout the system includes at least one gripping device with a cavity adapted for receiving the optical fiber therethrough and for securing thereto. The gripping device is adapted to transport, under computer control, the optical fiber in the system to a predetermined position to receive energy applied by at least one energy source for the automated production of the fiber optic device.

In accordance with another embodiment of the invention, system for automated production of a fiber optic device includes a chamber regulating an environment and/or atmosphere within for the automated production of the fiber optic device. A sealable input port, communicates with the chamber and substantially seals the environment and the atmosphere of the chamber. The sealable input port receives an optical fiber for insertion therethrough into the chamber. The system also includes at least one movable holding stage within the chamber, including at least one clamp securable to the optical fiber, and an energy source within the chamber, for applying energy to the optical fiber. At least one gripping device is included within the chamber, and includes a cavity adapted for receiving the optical fiber therethrough and for securing thereto. The at least one gripping device is adapted to transport the optical fiber from the sealable input port to the movable holding stage and to a predetermined position to receive the energy applied by the energy source. The system also includes a stripping device to strip a section of the optical fiber substantially at the predetermined position to receive the energy, a cleaving device to cleave at least one end of the optical fiber, and a fusion splicing device to fusion splice the end of the optical fiber. The system also includes a testing device to test the optical characteristics of the fiber optic device. The testing device has a test lead fusion spliced to the end of the optical fiber using the fusion splicing device. The system also includes a packaging device to package the fiber optic device in packaging for shipping to a customer, a labeling device to label packaging for shipping to the customer, a shipping device to ship the fiber optic device in the packaging to a customer, and a programmable controller. The programmable controller controls the sealable input port, the movable holding stage, the energy source, the gripping device, the stripping device, the cleaving device, the fusion splicing device, the testing device, the packaging device, the labeling device, and/or the shipping device.

In accordance with another embodiment of the invention, a system for automated production of a fiber optic device includes a gripping device having a cavity adapted for receiving an optical fiber therethrough and for securing thereto. The gripping device is adapted to transport the optical fiber and to connect an end of the optical fiber to a connector device facilitating connection of the optical fiber to another optical fiber and possibly another fiber optic device. The system also includes a collecting device, adapted to receive and collect a predetermined amount of the optical fiber responsive to operation of the gripping device.

In accordance with another embodiment of the invention, a system for automated production of a fiber optic device includes a chamber regulating an environment and/or atmosphere within for the automated production of the fiber optic device, and a sealable input port, communicating with the chamber and substantially sealing the environment and the atmosphere of the chamber. The sealable input port receives an optical fiber for insertion therethrough into the chamber. The system also includes at least one movable holding stage within the chamber, including at least one clamp securable to the optical fiber, and at least one energy source within the chamber, for applying energy to the optical fiber. The system also includes a gripping device within the chamber, with a cavity adapted for receiving the optical fiber therethrough and for securing thereto. The gripping device is adapted to transport the optical fiber from the sealable input port to the movable holding stage and to a predetermined position to receive the energy applied by the energy source.

These together with other objects and advantages which will be subsequently apparent, reside in the details of construction and operation as more fully herein described and claimed, with reference being had to the accompanying drawings forming a part hereof wherein like numerals refer to like elements throughout.

BRIEF DESCRIPTION OF THE DRAWINGS

FIG. 24 is an illustration of a transport device in accordance with a second embodiment used to transport the packaged fiber optic device;

DESCRIPTION OF PREFERRED EMBODIMENT OF THE INVENTION

Figure 1:
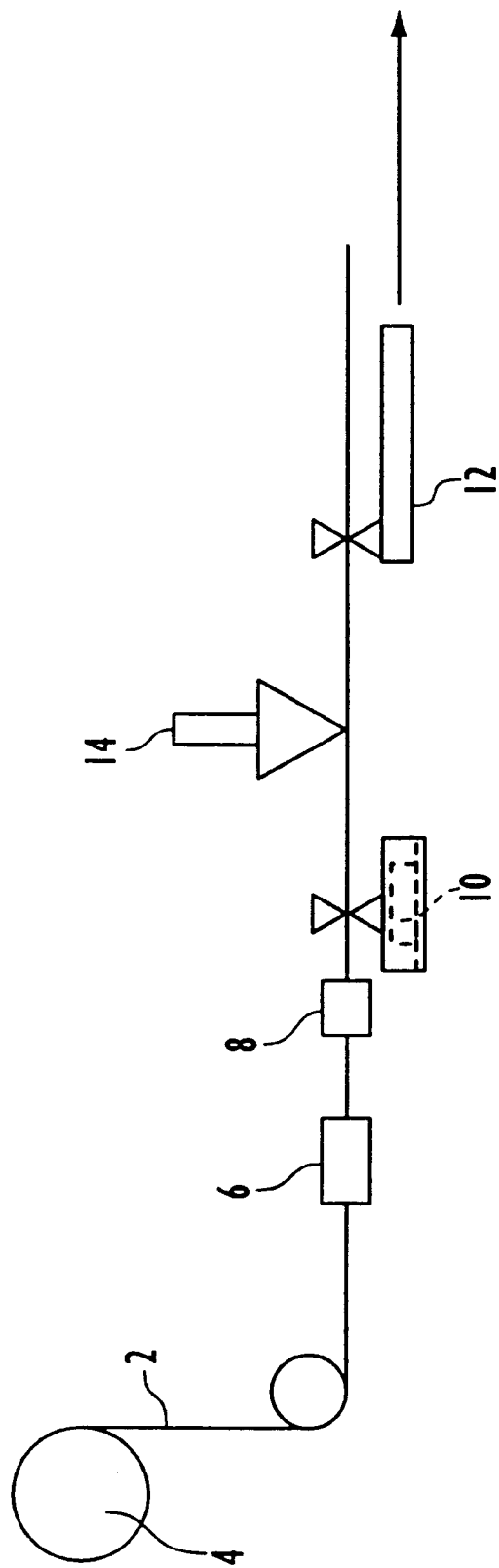
FIG. 1 is an illustration of a prior art apparatus for manufacturing a fused biconical tapered (FBT) device.

The present invention is used on, and provides accurate and reliable production and/or packaging of, optical fibers, devices and/or fiber optic devices (hereinafter "fiber optic devices") such as couplers, fiber optic couplers, fused biconical tapered (FBT) couplers, switches, optical switches, fiber optic switches, wave-division multiplexers (WDM), fiber optic WDMS, filters, fiber optic filters, attenuators, fiber optic attenuators, fiber optic polarizers, polarizers, waveguides, fiber optic waveguides, sensors, fiber optic sensors, connectors, fiber optic connectors, pigtails, fiber optic pigtails, patch cords, fiber optic patch cords, transmitters, fiber optic transmitters, receivers, fiber optic receivers, amplifiers, optical amplifiers, fiber optic amplifiers, and the like, that provide substantially similar optical responses, properties and/or indicators. These various fiber optic devices, such as the WDM, may be constructed of different materials such as glass, crystal, metal, plastic, ceramic and the like.

The present invention is used on, and provides accurate and reliable production and/or packaging and/or testing of, optical fibers, devices and/or fiber optic devices, for example, for fiber optic device formation, reinforcing, sealing, securing, and the like. One principal advantage of this apparatus and/or procedure is that it allows the optical fiber, device and/or fiber optic device to be produced, tested and/or packaged in a highly automated and/or completely automated apparatus and/or procedure. This apparatus and/or process can quickly and inexpensively transport, manufacture, test, and/or package fiber optic devices.

One use of this apparatus and/or process may be to provide connectors on and/or package devices for a manufacturer. Another advantage of this apparatus and/or process is that it allows large volumes of fiber optic devices to rapidly, reliably, and inexpensively be produced, packaged, and tested.

To illustrate this technique, I will conceptually demonstrate the production, packaging, and testing of a FBT coupler. The manufacture of other fiber optic devices would be similar. For clarity, this example uses two optical fibers to manufacture a fiber optic device, but the apparatus and/or process could also be applied using any number of optical fibers. The production, packaging, and/or testing of other or multiple optical fibers, devices, and/or fiber optic devices would be similar. The optical fiber in the example described below has only a single optical fiber, however, the process described herein may also be used for multiple optical fibers packaged together (e.g., optical fiber ribbon(s)) and/or separately.

The cabled optical fiber is comprised of, for example, an outer nylon protective jacket, a Kevlar yarn strength member, a polymer tight buffer coating, and the optical fiber therein. Of course, other optical fiber structures can be used with the process of the present invention described herein. That is, the structure of the various coating and/or outer layers and/or outer components used in connection with the optical fiber, device, and/or fiber optic device, does not affect the processes and resulting products described herein.

The apparatus and/or process described herein could also be applied to any device with at least a single optical fiber exiting therefrom. The production and/or packaging and/or testing of other optical fibers, devices and/or fiber optic devices would be similar (with the exception that some steps may be added and/or omitted based on the specific device being packaged and/or produced and/or tested), including packaging and/or production and/or testing of single optical fibers and/or devices.

Figure 2:
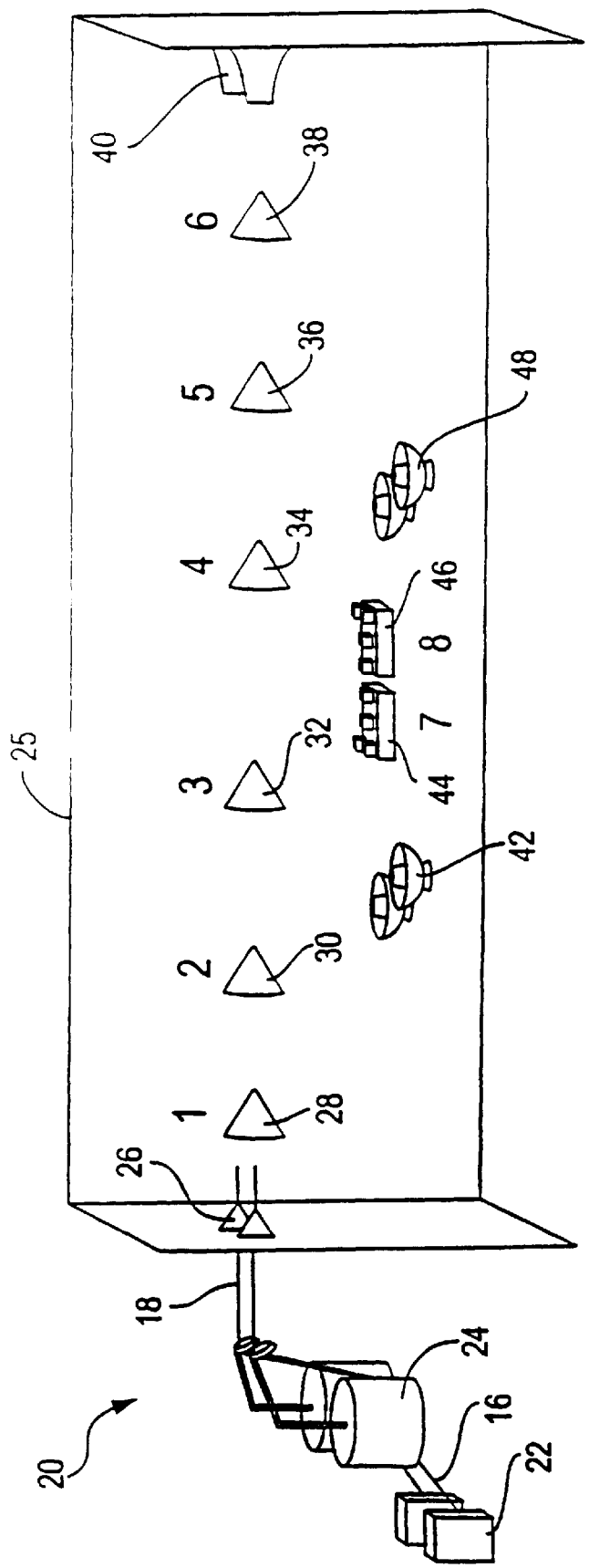
FIG. 2 is an illustration of an apparatus used to produce and package fiber optic devices in accordance with the present invention.

FIG. 2 is an illustration of an apparatus used to produce and package fiber optic devices in accordance with the present invention. FIG. 2 is presented to illustrate the relative position of each component, i.e., the positional relationships between components in the apparatus. The optical fibers 18 (reference numeral 18 denotes one or more optical fibers), used to produce, for example, couplers, are wrapped on spools 24 (shown as cylinders at far left, reference numeral 24 denotes one or more spools), and are selectively guided off the one or more spools 24 by a despooling mechanism described below in detail, attached, for example, at top of spools 24. The couplers are produced and packaged within, for example, an environmentally and/or atmospherically controlled chamber 25 (shown as walls in background).

The optical fibers 18 enter the chamber through sealed chamber ports 26 (shown as cones on left chamber wall, reference numeral 26 denotes one or more chamber ports), and are positioned within the chamber by, for example, grippers 28, 30, 32, 34, 36, 38 (shown as cones within the chamber, labeled 1→6). One or more sealed chamber ports 26 may advantageously be used to secure and/or position the end and/or a portion of one or more optical fibers 18 stored via an inventory of optical fiber spools 24, with possibly each having its own despooling mechanism and/or optical source 22, to allow the grippers 28 access thereto, for selective utilization of optical fibers 18 of similar and/or different characteristics. In addition, any number and/or position of grippers, and the like, may be used. The lengths of optical fiber 18 that will become coupler leads are fed into, and held within, for example, one or more coupler lead holding trays 42, 48 (shown as bowls near center of chamber). A pair of optical fiber holding stages 44, 46 and clamps disposed thereon (shown at center of chamber, labeled 7→8) are positioned to secure the optical fibers 18 on either side of the portion that will become the coupler.

Optical sources 22 (shown as boxes attached to optical fiber ends 16 on left side of spools 24, reference numeral 22 denotes one or more sources) and optical detectors 40 (shown as cylinders at far right of the chamber, reference numeral 40 denotes one or more detectors) are used for optical monitoring during production and packaging.

Sealed chamber port 26 can be of any suitable structure and/or combination of structures that is able to secure an end of an optical fiber in a predetermined and/or identifiable position, to allow when needed the optical fiber to be fed thereby, and to resecure when needed the optical fiber or a portion thereof. Sealed chamber port 26 may also be used to seal a chamber, such as an environmentally and/or atmospherically controlled chamber. For example, sealed chamber port 26 can be constructed of a standard gasket seal, and/or of the same/similar structure of the grippers 28, 30, 32, 34, 36, 38, described below in greater detail. If a sealed chamber 25 is not used, sealed chamber ports are not required, and therefore, other standard ports and/or devices and/or connectors may be used to secure and/or position the optical fiber for the production process described herein.

Advantageously, as will be described below in detail, the apparatus described in FIG. 2 is designed to implement a completely and/or substantially completely automated process for the production and/or testing and/or packaging of fiber optic devices. FIG. 2 is not necessarily the entire apparatus of the invention, but may be just the production/initial packaging station that may be the first station of many stations that may be part of the total automated process/apparatus of the invention. The apparatus is further designed to provide accurate control of the delivery and/or positioning and/or production of the optical fibers and/or fiber optic devices that may be used in the process described herein.

The specific configuration of the apparatus illustrated in FIG. 2 can be altered with respect to the number, positioning, specific components, and the like, so long as the ability to control the delivery and/or positioning and/or production of the optical fibers is maintained. In addition, a sealed chamber may not generally be required but may be desired, nor the ability to perform optical testing on all or any optical fiber(s) via the use of an optional optical source and optional detector. For clarity, many of the following figures will be portrayed using only a single optical fiber to represent one or more optical fibers to be processed using the apparatus and/or process of the present invention.

Figure 3:
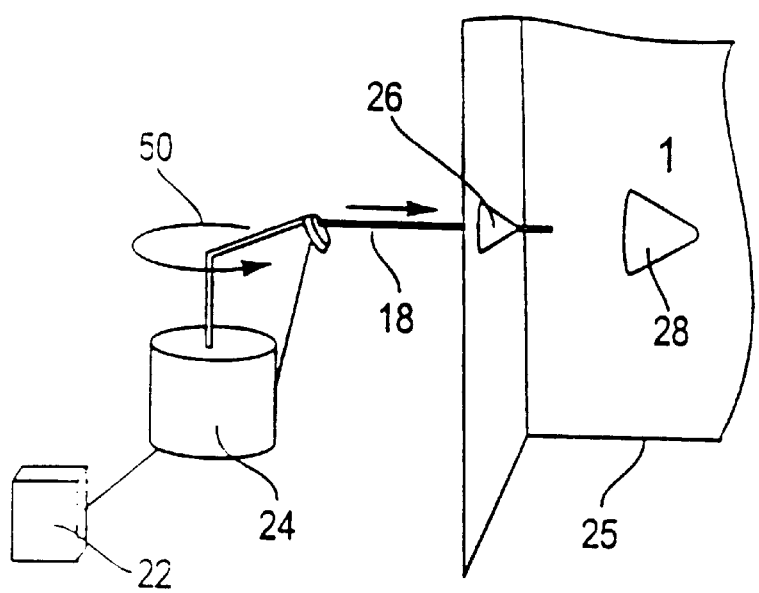
FIG. 3 is an illustration of the despooling of an optical fiber used in the production of a fiber optic device in accordance with the present invention.

FIG. 3 is an illustration of the despooling of an optical fiber used in the production of a fiber optic device in accordance with the present invention. In FIG. 3, the first step in producing the coupler is to begin to despool the optical fiber 18 so that it can be positioned within the apparatus. This may be accomplished by rotating a despooling mechanism, described in detail below, around the stationary spool 24 and optical source 22 in direction 50, allowing the optical source 22 to remain connected to the optical fiber 18.

Beneficially, since the optical source 22 may remain connected to optical fiber 18 throughout the despooling process, the optical source 22 can be used in subsequent testing of the fiber optic device produced by the production process, without further manual intervention. Alternatively, both the spool 24 and the attached optical source 22 can be rotated together, such as illustrated in the Dissertation incorporated herein by reference; however, this alternative imposes size limitations and/or configurations for the optical source 22. A further alternative is to first despool and/or unwind the optical fiber, and then connect a spooled and/or unspooled portion and/or end of the optical fiber to an optical source. This alternative can be accomplished either with a stationary or non-stationary spool.

Other configurations for despooling the optical fiber are also possible. The optical source need not be connected to the despooling mechanism and/or the spooled optical fiber. For example, one or more of the grippers may be used to position an end and/or some portion of the optical fiber into and/or with an optical source after the optical fiber has been despooled and/or positioned and/or secured to the production apparatus described herein. For example, the optical fiber may be spliced and/or connected to the optical source without be severed from the spooled fiber, and/or the optical fiber may be cut and then the cut end connected to the optical source. Further, the optical fiber may be despooled, and then the spooled and/or unspooled optical fiber subsequently connected to the optical source. Of course, the optical fiber need not even be connected to an optical source.

Figure 4:
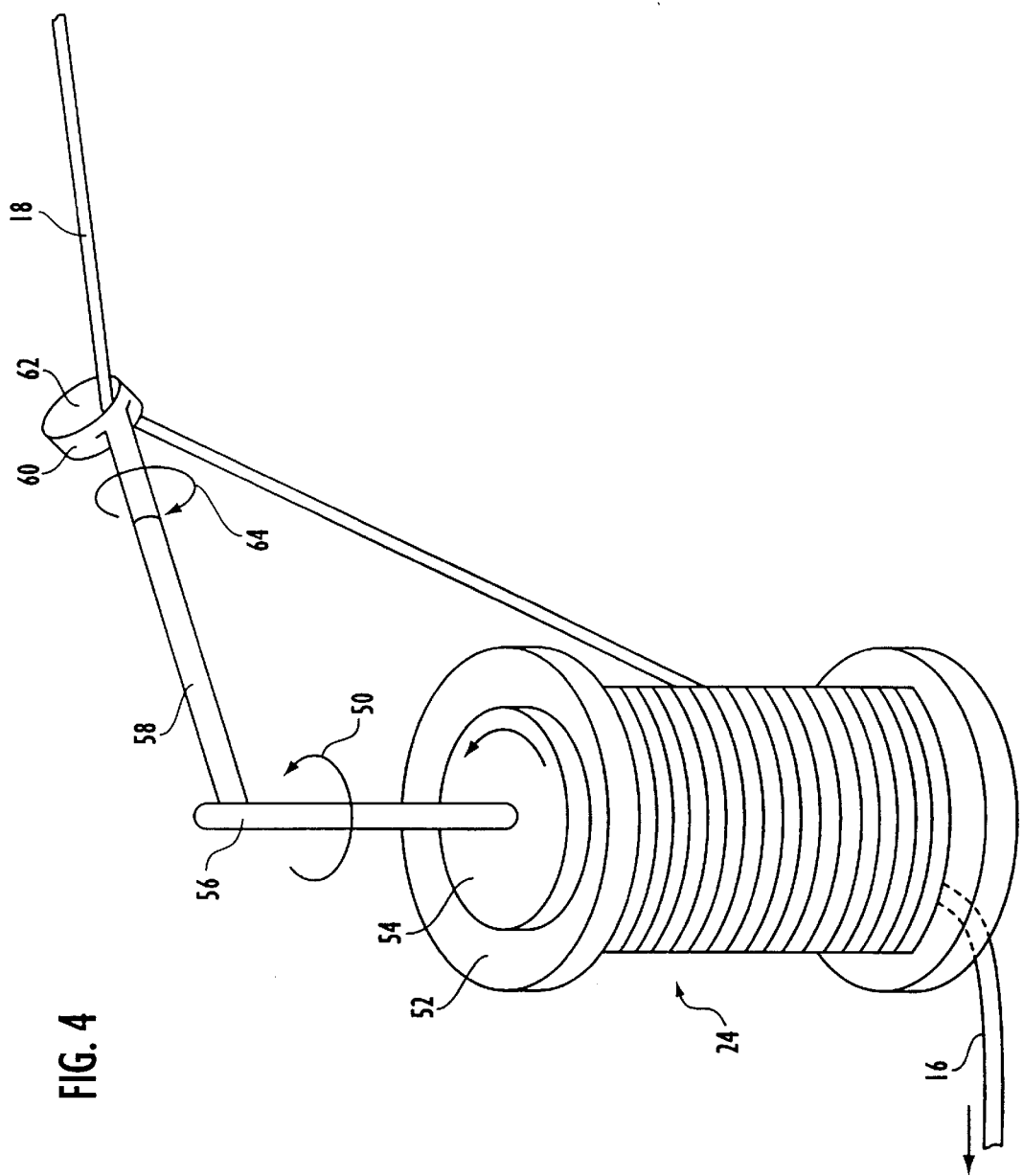
FIG. 4 is an illustration of a first embodiment of a despooler used in the despooling operation illustrated in FIG. 3, in accordance with the present invention.

FIG. 4 is an illustration of a despooler used in the despooling operation illustrated in FIG. 3, in accordance with the present invention. In FIG. 4, spool 24 is connected to an optical source via optical fiber portion 16. Optical fiber 18 is unwound from fiber spool 52, in, for example, direction 50 (or the opposite direction) by the rotation of a despooling mechanism including base 54, vertical arm 56 and fiber delivery arm 58, with respect to fiber spool 52. Fiber delivery arm 58 includes rotation extension 60 with optical fiber receiver 62.

Rotation extension 60 rotates around, for example, direction 64 (or the opposite direction), at substantially the same time the optical fiber 18 is being despooled from fiber spool 52 to unwind the optical fiber and/or remove any undesired fiber twist that may result otherwise. Other configurations of the despooling mechanism may, of course, be used as well. For example, different configurations of the base, arms, extension and/or receiver may be used.

Figure 4A:
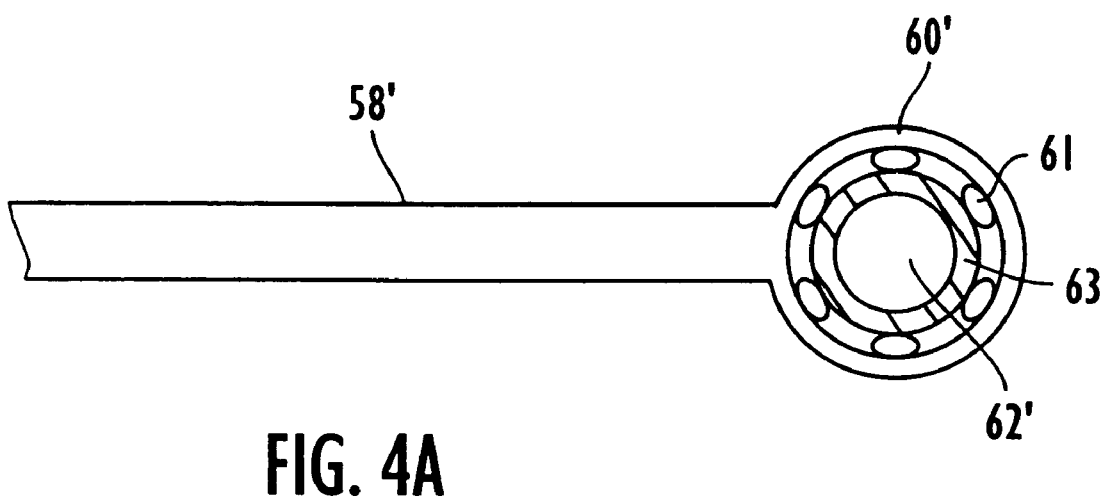
FIG. 4A is an illustration of a second embodiment of a despooler used in the despooling operation illustrated in FIG. 3, in accordance with the present invention.

FIG. 4A is an illustration of a second embodiment of a despooler used in the despooling operation illustrated in FIG. 3, in accordance with the present invention. In FIG. 4A, the optical fiber is unwound from the fiber spool by the rotation of a despooling mechanism including fiber delivery arm 58', with respect to the fiber spool. Fiber delivery arm 58' includes rotation extension 60' with optical fiber receiver 62'. To facilitate the despooling of the optical fiber without creating any undesired twists, rotation extension 60' includes inner rotation ring 63 that is rotatable within and/or about rotation extension 60' via, for example, ball bearings 61.

Accordingly, rotation extension 60' rotates around the fiber spool and/or rotation ring 63 rotates around rotation extension 60' at substantially the same time the optical fiber is being despooled therefrom to unwind the optical fiber and/or remove any undesired fiber twist that may result otherwise. Other modified structures of the fiber delivery arm 58' and rotation extension 60' may be used that provide this dual type of rotation to facilitate the removal of the optical fiber from the fiber spool and possibly without creating any undesired twisting in the optical fiber. For example, the ball bearings may be replaced by any suitable structure that permits the inner rotation ring 63 to rotate within rotation extension 60'. Further, the specific circular shape of extension section 60' may be altered and/or modified as desired.

Rotation extension 60' and inner rotation ring 63 may also be configured to operate at a controlled rate, under, for example, the actuation of a servo motor and the like, to facilitate the delivery of the optical fiber untwisted and/or at a desired twist. Inner rotation ring 63 may be designed to be larger than, substantially the same size, and/or smaller than the diameter of the optical fiber, depending on, for example, the co-action desired between the inner extension ring 63 and the optical fiber. For example, if it is desired that the optical fiber be easily dispensed through the extension ring 63, then the extension ring 63 may be dimensioned larger than the optical fiber. On the other hand, if more control is desired over the co-action of the inner extension ring 63 and the optical fiber, for example when the inner extension ring 63 is motor controlled or controlled by other active devices and/or methods, then the inner extension ring 63 may be dimensioned such that co-action between it and the optical fiber is increased, such as by increasing the surface contact therebetween. Of course, additional materials and/or notches and/or surface configurations may be disposed within inner extension ring 63 to, for example, facilitate the co-action, or lack thereof, between it and the optical fiber.

Figure 4B:
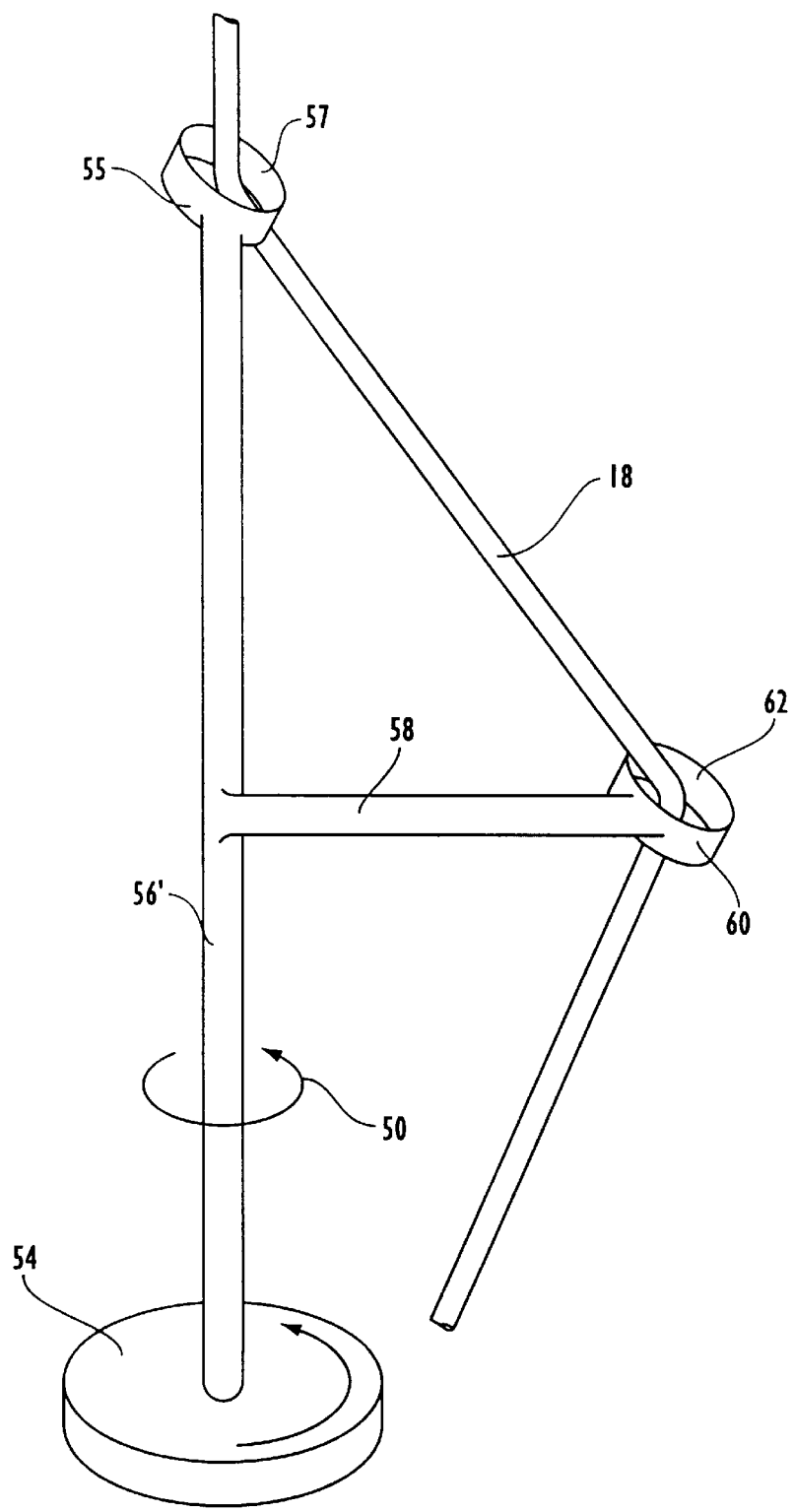
FIG. 4B is an illustration of a third embodiment of a despooler used in the despooling operation illustrated in FIG. 3, in accordance with the present invention.

FIG. 4B is an illustration of a third embodiment of a despooler used in the despooling operation illustrated in FIG. 3, in accordance with the present invention. In FIG. 4B, the optical fiber 18 is unwound from the optical fiber spool, in, for example, direction 50 (or the opposite direction) by the rotation of a despooling mechanism including base 54, vertical arm 56' and fiber delivery arm 58, with respect to the optical fiber spool. Fiber delivery arm 58 includes rotation extension 60 with optical fiber receiver 62.

Rotation extension 60 rotates in the same direction 50 with vertical arm 56' at substantially the same time the optical fiber 18 is being despooled from the fiber spool to unwind and/or remove the fiber twist that may result otherwise. Advantageously, vertical arm 56' includes an additional rotation extension 55 with optical fiber receiver 57. Rotation extension 55 further guides the optical fiber for threading into the production process described herein, while minimizing the amount of tension created on optical fiber 18 from being unwound from the optical fiber spool. Rotation extension is also advantageously positioned such that optical fiber 18 is fed into the production apparatus, for example, the sealed chamber ports, directly and/or without an angle and/or turn and/or bend. To facilitate the positioning of the optical fiber without an angle with respect to the sealed chamber ports, the optical fiber spools and/or despooling mechanisms may be configured to rotate along an axis that is substantially parallel with, and despooling towards, the entrance of the sealed chamber ports. For example, the optical fiber spools 24 and/or despooling mechanisms illustrated in FIG. 2, can be rotated approximately 90 degrees for rotation along an axis that is substantially parallel with, and despooling towards, the entrance of the sealed chamber ports 26.

As indicated previously, other configurations of the despooling mechanism may, of course, be used as well. For example, different configurations of the base, arms, extension and/or receiver may be used. In addition, the structure of rotation extension 60 and/or rotation extension 55 advantageously may be, for example, of the structure of the rotation extension described in FIG. 4A. For example, the electric demand prefeeder PF 1000/PF 2000 manufactured by Schleuniger, Inc., 150 Dow Street, Tower Four, Manchester, N.H. 03101 may be used.

An alternative method of preventing the spooled optical fiber from twisting when despooled is to wind the optical fiber onto the spool in the reverse of the manner that the spooled optical fiber will subsequently be despooled. In addition, other standard methods of despooling and/or paying out the optical fiber, possibly without requiring the spool and/or the spooled optical fiber and/or the optical source to be rotated and/or moved, may also be used.

Figure 5:
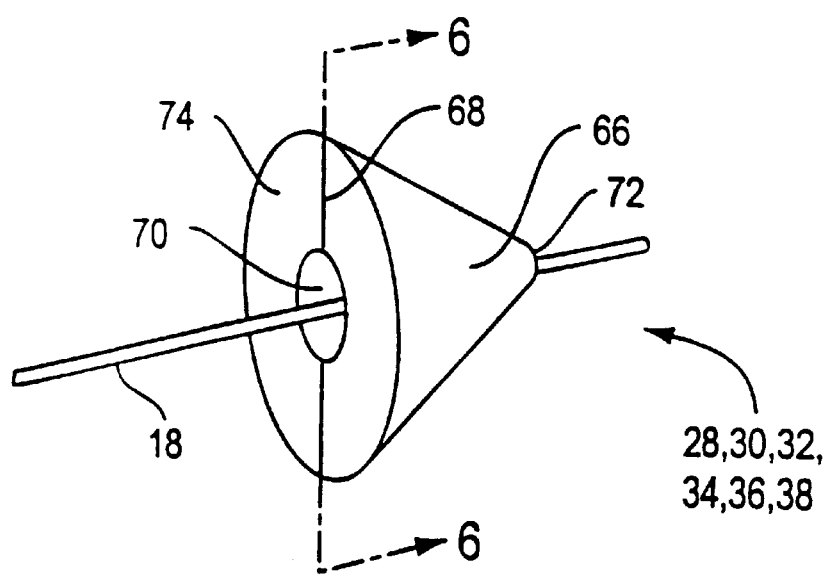
FIG. 5 is an illustration of a gripper used to position an optical fiber used in the production of a fiber optic device in accordance with the present invention.

FIG. 5 is an illustration of a gripper used to position an optical fiber used in the production of a fiber optic device in accordance with the present invention. In FIG. 5, gripper 28, 30, 32, 34, 36, and/or 38 includes cone or tapered section 66 ending at tip 72 having a sufficient diameter for the optical fiber 18 to protrude therethrough. The gripper includes base section 74 with tapered cavity 70. The gripper is formed of two pieces, described below in greater detail, and is joined at joint or juncture 68. As will be explained below in greater detail, the gripper frictionally and/or compressively controls the passage of the optical fiber therethrough, and provides the advantageous end control and/or loose/unsecured fiber control and/or sectional fiber control therefor, for the production process.

Figure 6:
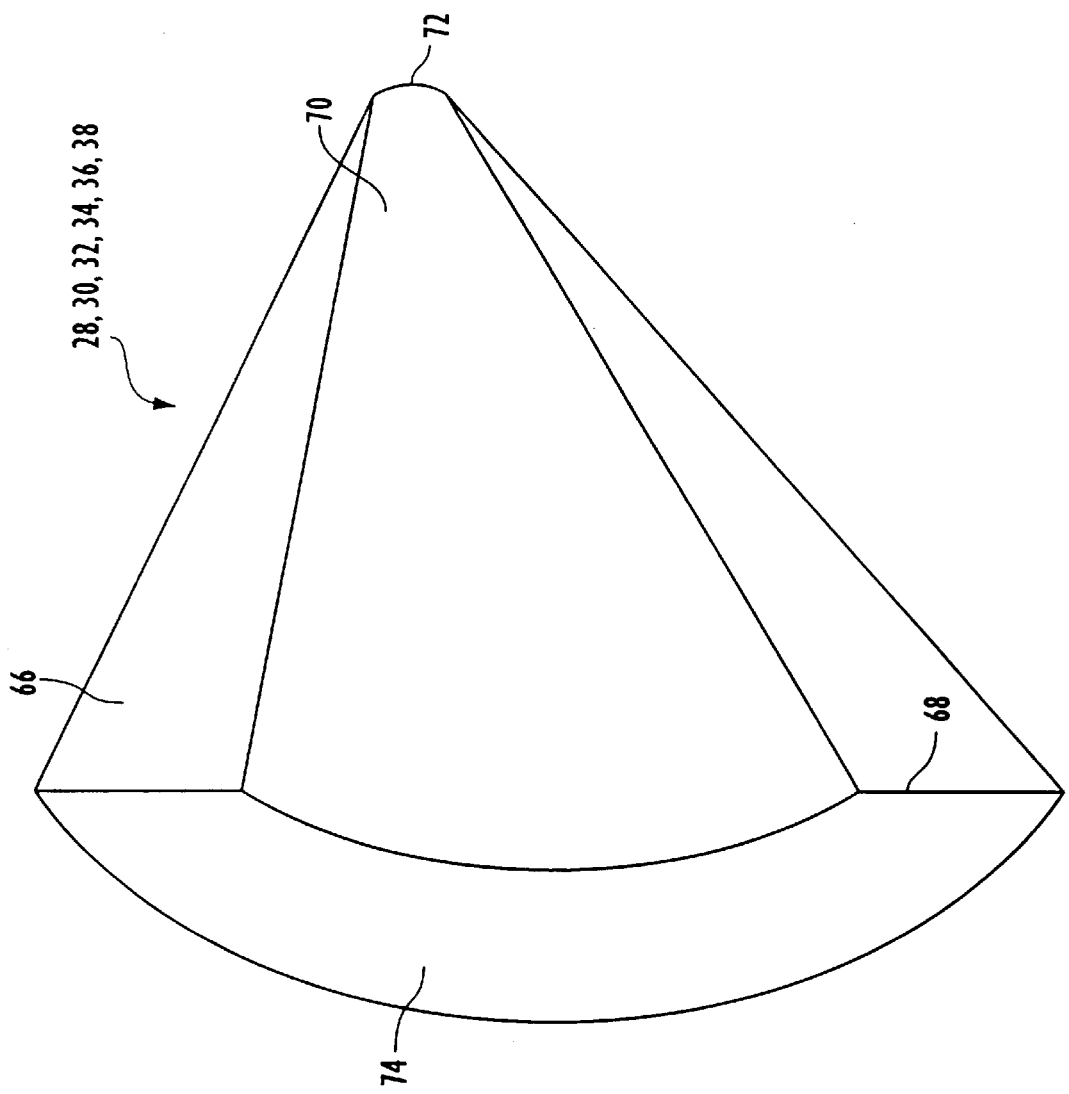
FIG. 6 is an illustration of a sectional view of the gripper illustrated in FIG. 5 in accordance with the present invention.

FIG. 6 is an illustration of a sectional view of the gripper illustrated in FIG. 5 along section lines 6—6 in accordance with the present invention. In FIG. 6, gripper 28, 30, 32, 34, 36, and/or 38 includes cone or tapered section 66 ending at tip 72 having a sufficient diameter for an optical fiber to be inserted therein and/or protrude therethrough. The gripper includes base section 74 with tapered cavity 70. Juncture 68 joins and/or confronts with the juncture on the opposite tapered section of the gripper.

The gripper frictionally and/or compressively controls the passage of the optical fiber therethrough by having its inner tapered cavity 70 dimensioned slightly larger, slightly smaller or equal to the diameter of the optical fiber. The tapered cavity 70 optionally includes additional body, lump and/or mass in and/or fully or partially surrounding and/or protruding into its cavity 70 at one or more places that can provide additional compressive and/or motive force on the optical fiber disposed therein, to control the delivery of the optical fiber through the production process. The tapered cavity may alternatively include, for example, any standard roller system, pulley system, and/or pneumatic system that may be used to secure, release and/or convey the optical fiber therein and/or therethrough.

Figure 7:
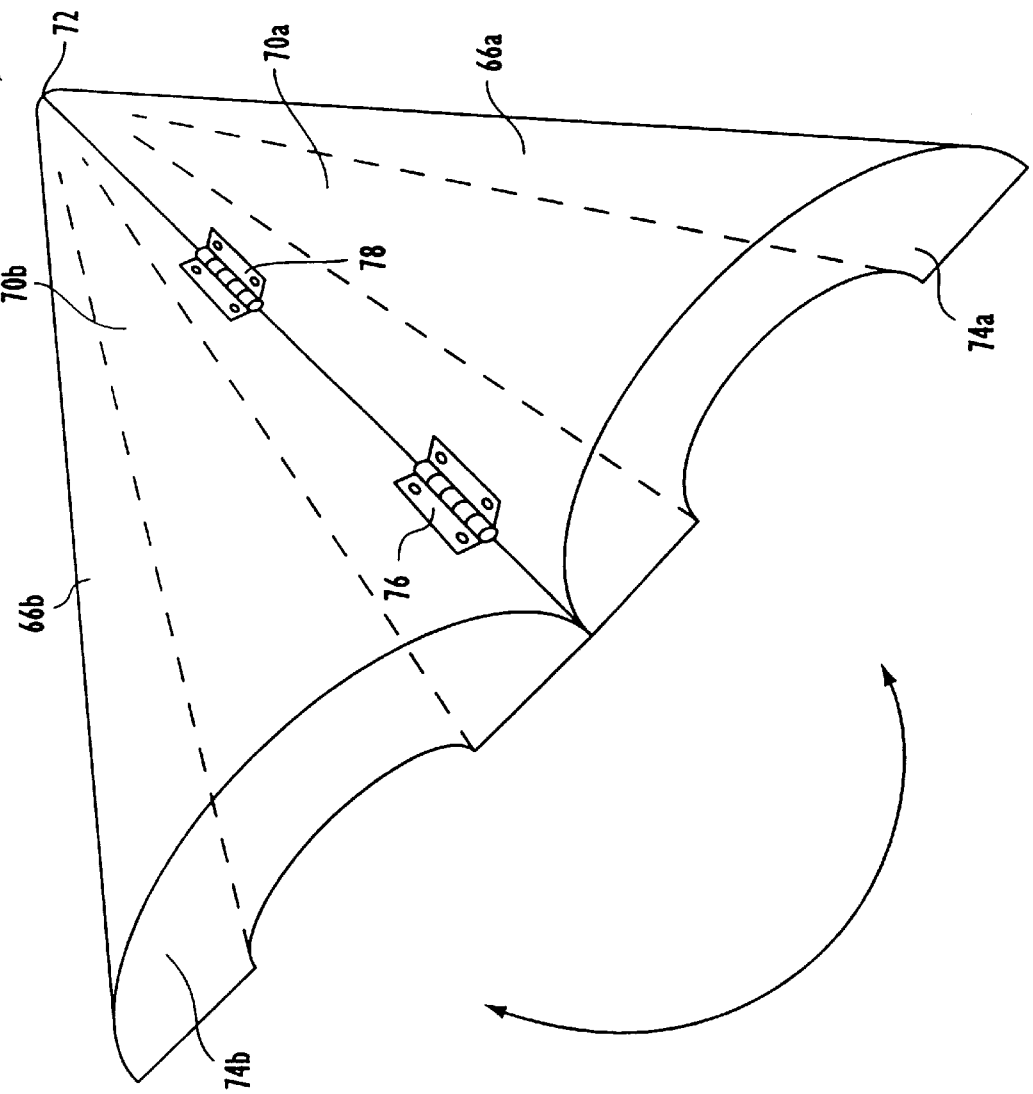
FIG. 7 is an illustration of a isometric view of the gripper illustrated in FIG. 5 when opened in accordance with the present invention.

FIG. 7 is an illustration of a isometric view of the gripper illustrated in FIG. 5 when opened in accordance with the present invention. As illustrated in FIG. 7, gripper 28, 30, 32, 34, 36, and/or 38 includes cone or tapered sections 66a, 66b ending at tip 72 having a sufficient diameter for an optical fiber to protrude therethrough. The gripper includes base sections 74a, 74b with tapered cavity 70a, 70b. The gripper may be hinged via hinges 76, 78 allowing the gripper to open and close on the optical fiber, thereby controlling the passage of the optical fiber therethrough.

Of course, gripper 28, 30, 32, 34, 36, and/or 38 can be any other structure and/or shape that provides similar functionality to transport the optical fiber through the production process. For example, gripper 28, 30, 32, 34, 36, and/or 38 may optionally be constructed and/or comprised, completely and/or partially, of the clamp unit or the like, described in U.S. Pat. No. 5,395,101, incorporated herein by reference. Alternatively, gripper 28, 30, 32, 34, 36, and/or 38 can be constructed and/or comprised, completely and/or partially, of any suitable clamp sold by, for example, Fiber Instrument Sales, Inc., 161 Clear Road, Oriskany, N.Y. 13424, the catalog of which is submitted herewith, and incorporated herein by reference. Examples include Connector & Cable clamp, part # F1-6209 and/or the Opti-Grip device, incorporated herein by reference. Gripper 28, 30, 32, 34, 36, and/or 38 may be actuated and/or opened and/or closed by and/or under the control of, for example, any standard actuator. In addition, gripper 28, 30, 32, 34, 36, and/or 38 may be positionally controlled and/or moved via and/or under the control of, for example, any standard conveying system, such as a standard overhead gantry, that can be used in one or more of the x-y-z directions. One example of an x-y gantry is Anorad's linear motor gantry manufactured by Anorad Corporation of 110 Oser Avenue, Hauppauge, N.Y. 11788.

Figure 8:
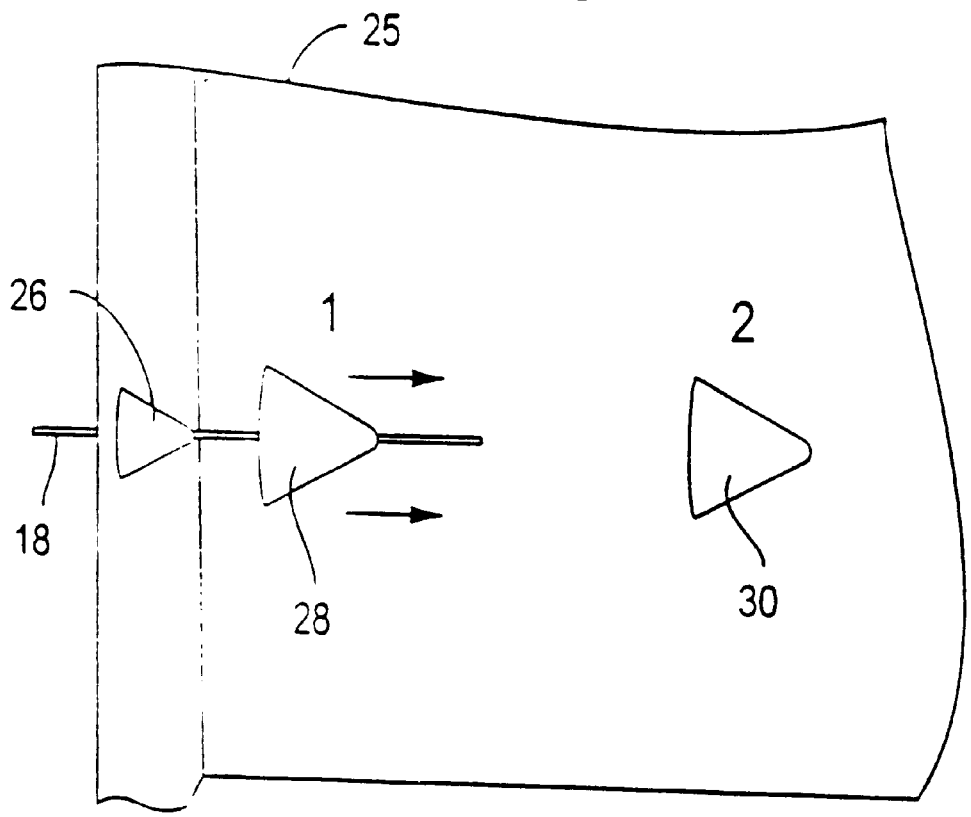
FIG. 8 is an illustration of the transfer and positioning of an optical fiber to a gripper from a sealed chamber port in the production of a fiber optic device in accordance with the present invention.

FIG. 8 is an illustration of the transfer and positioning of an optical fiber to a gripper from a sealed chamber port in the production of a fiber optic device in accordance with the present invention. The first step in positioning optical fiber 18 within the production apparatus is to transfer the end of the selected optical fiber 18, held by sealed chamber port 26, to gripper 1 (designated by reference numeral 28). The end of the optical fiber 18 is fed through gripper 1 (reference numeral 28) which, after securing the optical fiber 18, then itself advanced towards gripper 2 (designated by reference numeral 30), thereby exerting a pulling force on optical fiber 18. The sealed chamber port 26 may be configured, for example, as a stationary gripper and/or a stationary gasket seal, and/or operated in a similar manner. In this case, the optical fiber is exchanged between the sealed chamber port and the gripper in a similar manner as exchanged between grippers, as described and below in detail, except the sealed chamber port would generally be stationary and the gripper would move backward to receive the optical fiber therein.

Alternatively, when the gripper includes an internal conveying system, the conveying system may transport the optical fiber, with or without, the gripper moving. Thus, the end and/or some portion(s) of the optical fiber may be guided throughout the production process in a controlled manner using one or more of the above alternatives. This controlling of the end and/or some portion(s) of the optical fiber beneficially provides the capability to control the entire and/or any desired portion(s) of the optical fiber in the production process. This control of the optical fiber facilitates the automated processing of the optical fiber and/or fiber optic device by, for example, easily finding and/or securing the end and/or any desired portion(s) of the optical fiber when desired for connecting, processing, drawing, clamping, positioning, and/or transporting, and the like.

Figure 9:
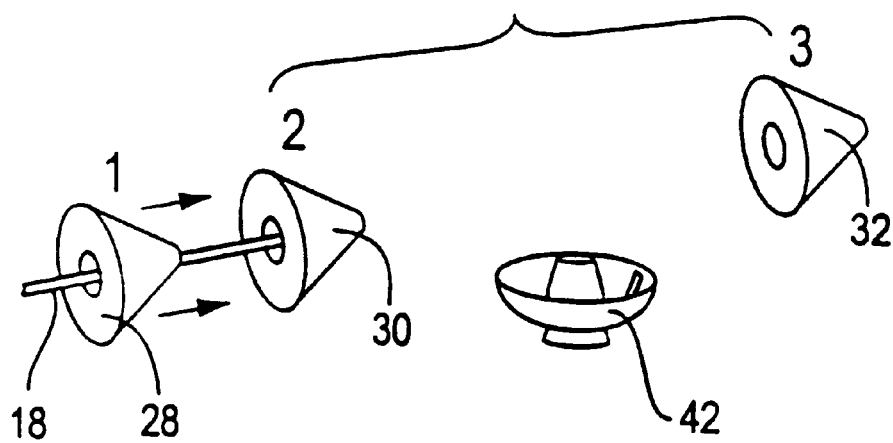
FIG. 9 is an illustration of the advancement of the optical fiber from a first gripper into the large tapered cavity of a second gripper, to gently guide the end of the optical fiber therein.

FIG. 9 is an illustration of the advancement of the optical fiber from a first gripper into the large tapered cavity of a second gripper, to gently guide the end of the optical fiber therein. Gripper 1 (reference numeral 28) advances and inserts the end of the optical fiber 18 into the large tapered cavity of gripper 2 (reference numeral 30), which is tapered to gently guide the end of the optical fiber, and/or the narrow tapered end of gripper 1 (reference numeral 28), into the proper position within gripper 2 (reference numeral 30).

The end of the optical fiber 18 is now transferred to, fed through, and secured by gripper 2 (reference numeral 30), which then advances towards gripper 3 (reference numeral 32). In this manner, the end of the optical fiber 18 is transferred from gripper to gripper, threaded through any components required for packaging, and thereby fed through the production apparatus. Holding tray 42 is depicted for receiving an optical fiber lead of optical fiber 18 for coiling a desired length therein, described below in detail.

Figure 10:
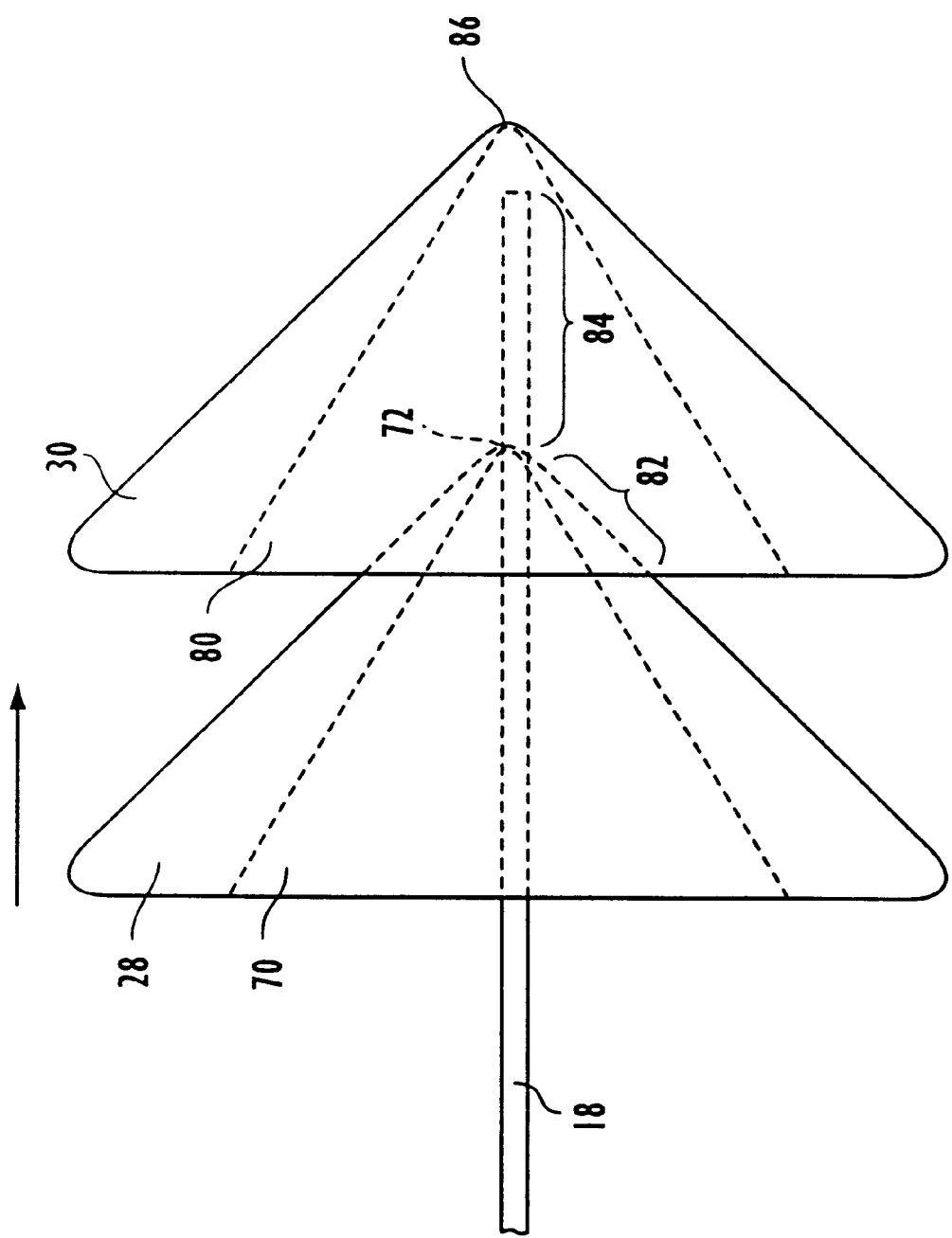
FIG. 10 is an illustration of an enlarged view of a first level advancement of the optical fiber from a first gripper into the large tapered cavity of a second gripper prior to when the optical fiber is completely inserted through the second gripper.

FIG. 10 is an illustration of an enlarged view of a first level advancement of the optical fiber from a first gripper into the large tapered cavity of a second gripper prior to when the optical fiber is completely inserted through the second gripper. While FIG. 10 depicts the first level advancement process for grippers 28 and 30, this process may apply for all grippers used in the production apparatus of the present invention. Of course, the specific steps of positioning and/or transporting the optical fiber throughout the process can be varied, depending on the fiber optic device that is being produced. For example, if no fiber optic leads are needed, then holding trays may possibly not be used.

In FIG. 10, gripper 28 pulls and/or transports optical fiber 18 secured to and/or within its tapered cavity 70 and possibly extending through its tip 72 by a predetermined distance 84. Gripper 28 advances and its upper cone portion 82 optionally enters cavity 80 of gripper 30, thereby optionally advancing and/or causing to be advanced optical fiber 18 the predetermined distance 84 into cavity 80. Optical fiber 18, in accordance with FIG. 10, does not penetrate and/or exit from tip 86 of gripper 30. Of course, the procedure described herein can be modified, depending on the length of the optical fiber, cavity size of the gripper, and relative dimensions to each other.

Figure 11:
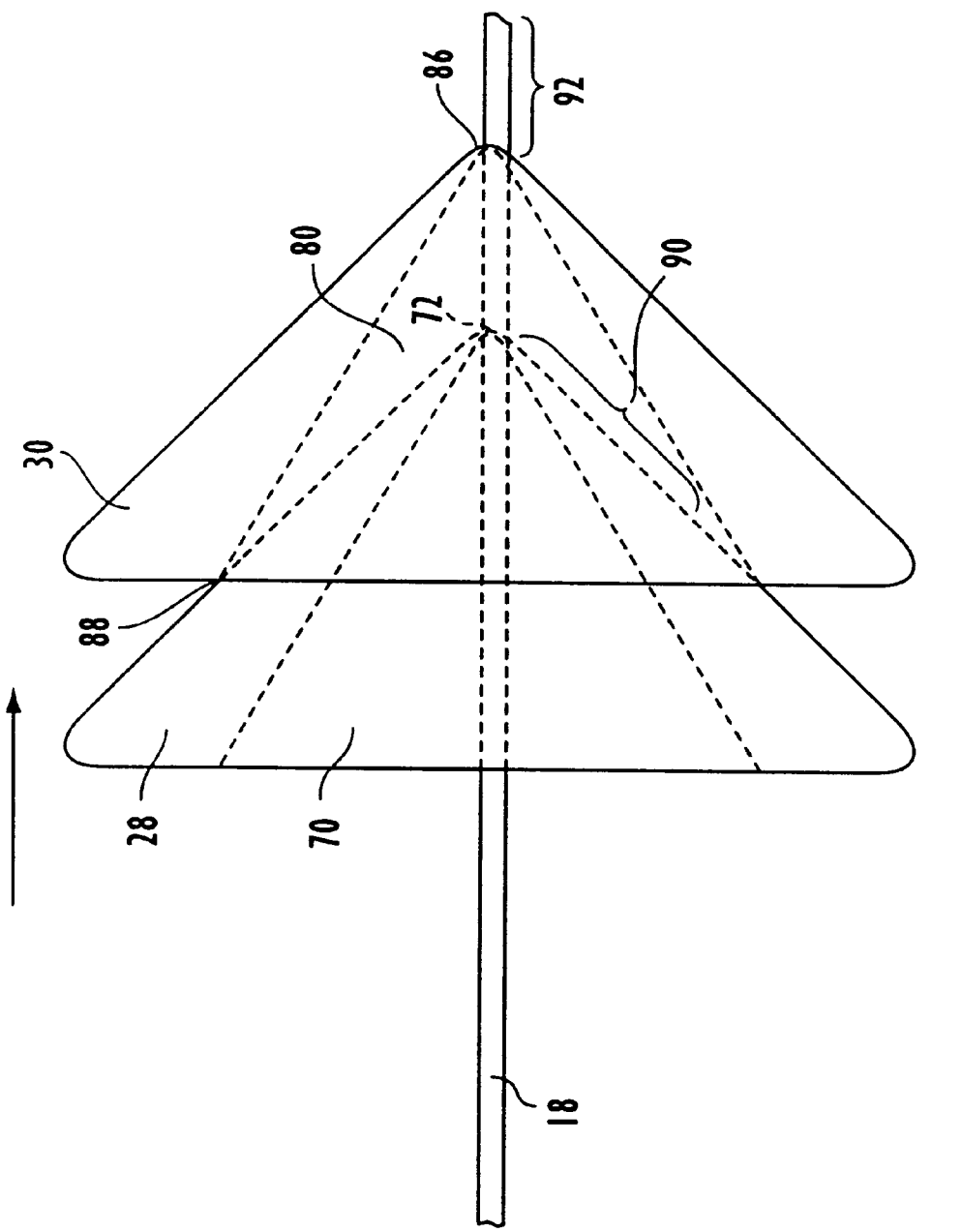
FIG. 11 is an illustration of an enlarged view of a second level advancement of the optical fiber from a first gripper into the large tapered cavity of a second gripper after the optical fiber is completely inserted through the second gripper.

FIG. 11 is an illustration of an enlarged view of a second level advancement of the optical fiber from a first gripper into the large tapered cavity of a second gripper after the optical fiber is completely inserted into and/or through the second gripper. While FIG. 11 depicts the second level advancement process for grippers 28 and 30, this process may apply for all grippers used in the production apparatus of the present invention.

In FIG. 11, gripper 28 pulls and/or transports optical fiber 18 secured to and/or within its tapered cavity 70 and possibly extending through its tip 72 through cavity 80 and tip 86 of gripper 30 by a predetermined distance 92. Gripper 28 advances and its upper cone portion 90 optionally enters cavity 80 of gripper 30, until it can no longer advance in cavity 80, illustrated at area 88. Optical fiber 18, in accordance with FIG. 11, penetrates and/or exits from tip 86 of gripper 30. Gripper 30 may now be transferred control of optical fiber 18 from gripper 28, by gripper 28 releasing its control over, and/or grip on, optical fiber 18 and withdrawing from gripper 30, and by gripper 30 securing and/or compressing on optical fiber 18. As described above, the procedure can be modified, depending on the length of the optical fiber, cavity size of the gripper, and relative dimensions to each other.

Of course, FIGS. 10–11 are merely examples of one process of transporting the optical fiber through one or more grippers; other processes are also possible. For example, one gripper need not enter the cavity of a subsequent gripper positioned in the production process for transfer and/or control. In addition, the optical fiber may be secured within, and not protrude from, the cavity of the gripper and movement and/positioning thereby controlled during the production process. The optical fiber may also be transferred and/or transported from one gripper to another using one or more internal transport mechanisms, such as, for example, a standard pulley system, a standard roller system, and/or a standard pneumatic system described above.

The grippers described herein are merely examples of a device and/or method capable of securing and/or controlling the end and/or some portion(s) of the optical fiber; other device(s) and/or method(s) may also be used providing similar functionality. Accordingly, any device and/or method capable of securing and/or controlling of the end and/or some portion(s) of the optical fiber may be used. As was described above, this beneficially provides the capability to control the entire and/or any desired portion(s) of the optical fiber in the production process.

Figure 12:
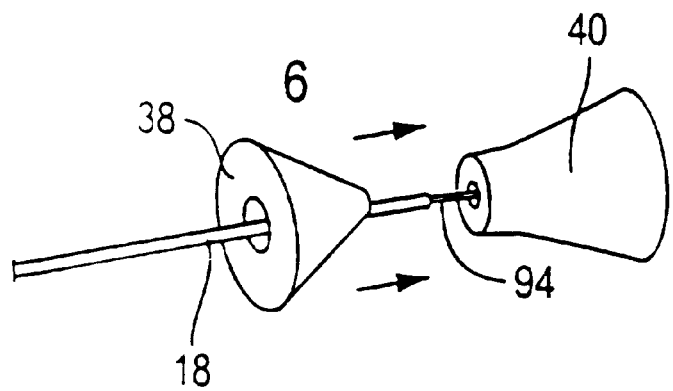
FIG. 12 is an illustration of the optical fiber being positioned in an optical detector after the optical fiber is stripped, cleaved, and positioned by the gripper.

FIG. 12 is an illustration of the optical fiber being positioned in an optical detector by the gripper, possibly after the end of the optical fiber has been positioned by the gripper for optional stripping and/or cleaving. After the optical fiber 18 is fed through the production apparatus and through one or more of grippers 28, 30, 32, 34, 36 and/or 38, the end of the optical fiber 18, held by gripper 6 (reference numeral 38), is, if desired, stripped and/or cleaved in a standard manner. The optionally stripped and/or cleaved portion 94 is positioned and then attached to and/or optically connected to and/or in optical communication with (e.g., held in front of) optical detector 40 (shown as the cylinder).

Optical detector 40 and/or possibly the optical source may also be connected to a standard process control system. The control system is used to test and/or control the formation of optical properties of the fiber optic device and/or optical fibers produced by the apparatus described herein, before, during, and/or after the production and/or packaging process has been completed, using the optical properties detected by detector 40.

Various standard methods of automatically and/or manually stripping and/or cleaving the optical fiber may be used, such as the method described in the Dissertation, and/or the methods/devices sold by Fiber Instrument Sales, Inc., 161 Clear Road, Oriskany, N.Y. 13424. Examples include Cleaver Part #s F1-0010; WO 2220; 92208; FCP3; CT07; MR1; FK 11-1; Stripper Part #s JR-2; JR-11, incorporated herein by reference. In addition, other devices may also be used for the stripping and/or cleaving of the optical fiber, such as an excimer laser, and the like. For example, Kevlar Cutting Machine FO 7010 manufactured by Schleuniger, Inc., 150 Dow Street, Tower Four, Manchester, N.H. 03101 may be used to remove the kevlar portion of the optical fiber. In addition, stripping machines US 2545, FO 7020, FO 7045 manufactured by Schleuniger, Inc., may also be used. Automatic cutting machines may also be used to cut the optical fiber, such as RC 3250, UC 3100, UC 3750 or OC 3950 manufactured by Schleuniger, Inc. Further, combination cutting and stripping machines may also be used, such as CS 9050, CS 9100 or CS 9170 also manufactured by Schleuniger, Inc.

Alternatively, instead of using gripper 6 (reference numeral 38) to transport optical fiber 18 to detector 40, a telescoping tube(s) and/or actuator(s) positioned, for example, at or near the detector 40, may be moved across to the optical fiber(s) secured by, for example, the sealed chamber port(s), and used to secure to the optical fiber(s) and draw same into and/or toward and/or near detector 40 for subsequent securing and/or connection thereto. Any pre-threading operation(s) may also be performed by the telescoping actuator threading through any desired components during initial movement toward the optical fiber(s), and subsequently pulling the optical fiber(s) therethrough during the movement back toward the detector.

Of course, the telescoping actuator(s) may alternatively be positioned near, for example, the sealed chamber port and used to push the optical fiber(s) toward the detector(s), instead of pulling same, i.e., in the reverse direction. The pre-threading operation can then also be performed in the reverse direction.

Figure 13:
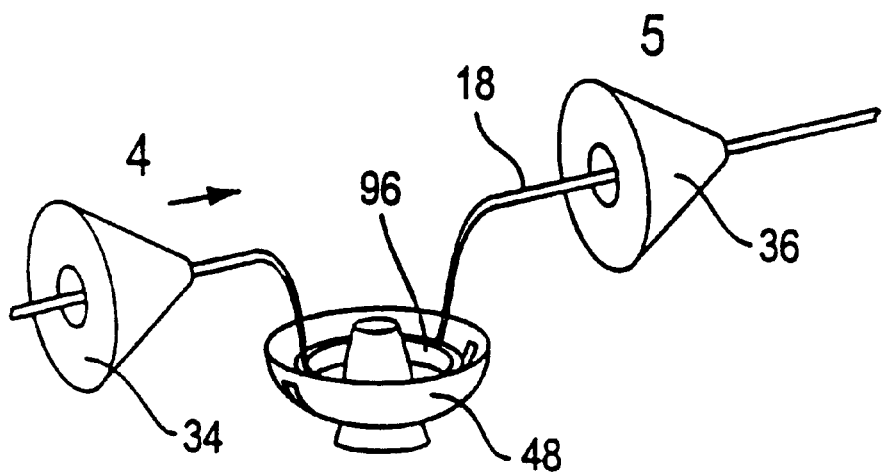
FIG. 13 is an illustration of the optical fiber that will be used as a coupler lead being fed into a holding tray.

FIG. 13 is an illustration of the optical fiber that will be used as a coupler lead, being fed into holding trays. In FIG. 13, the lengths of optical fiber 18 that will become a coupler lead are fed into holding tray 48. Shown are grippers 4 and 5 (reference numerals 34, 36) feeding optical fiber 18 into holding tray 48. Gripper 5 (reference numeral 36) is held substantially stationary, maintaining a secure grip on the optical fiber 18.

Gripper 4 (reference numeral 34), holding the optical fiber 18, advances a set distance towards gripper 5 (reference numeral 36), creating one or more loops 96 of optical fiber 18 of a known approximate length in the holding tray 48. The known approximate length of the coiled optical fiber may be determined, for example, by the spatial relationship (s) and/or relative movement of the grippers and/or the diameter and/or dimensions of the holding tray 48. The number of loops to be created within holding tray 48 may be determined by, for example, dividing the desired approximate length of the lead by the circumference and/or dimension of the holding tray 48. Gripper 4 (reference numeral 34)

then releases the optical fiber 18, moves back or returns to its starting position, regains hold of the optical fiber 18 at this position again, and repeats this procedure until an optical fiber lead of the desired length is coiled within the holding tray 48 as the one or more loops 96.

This procedure is then repeated by grippers 2 and 3 (reference numerals 28, 30). That is, grippers 2 and 3 (reference numerals 28, 30) perform a similar process of creating slack and/or pulling optical fiber 18 into a loop(s) 96 that is stored and/or coiled in holding tray 42 positioned between grippers 2 and 3 (reference numerals 28, 30).

This order of first coiling the optical fiber 18 in the far holding tray 48 has the particular advantage of maintaining tight and/or precise control over the optical fiber and/or its length and/or position during this process. That is, if the optical fiber is coiled first between grippers 2 and 3 (reference numerals 28, 30), grippers 4 and 5 (reference numerals 34, 36) would be creating slack and/or leads in holding tray 48 from the optical fiber stored in holding tray 42, which would be a more complex procedure. However, this more complex procedure could also be accomplished in accordance with the apparatus described herein by storing sufficient additional optical fiber in holding tray 42 that will provide the desired lead length for subsequent storage in holding tray 48.

Of course, other procedures and/or devices may also be used to store and/or coil the optical fiber into a holding tray. In addition, the optical fiber need not be spooled in holding trays if no leads are desired. In addition, the optical fiber need not be spooled in holding trays even if leads are desired. Coiling leads in holding trays is one method of forming and/or holding excess lengths to be used, for example, as leads. Other methods and/or configurations can be used such as, for example, serpentine parallel lengths as is used for extension cords. These other methods and/or configurations may be performed, for example, by using grippers such as those described above. Further, the specific order and/or time of coiling the optical fiber to create the leads may be done at any time during the production process prior to being shipped. For example, the optical fiber lead in holding tray 48 may be coiled prior to fiber optic device fabrication, and the optical fiber lead in holding tray 42 may be coiled after fiber optic device fabrication. Alternatively, one or more leads may be, for example, fusion spliced to the fiber optic device after device fabrication and/or prior to shipping.

In addition, the grippers may also be used to turn on its axis and/or twist and/or detwist the optical fiber, and/or assist in the preceding operations. This may be used, for example, to facilitate the despooling of the optical fiber and/or coiling of the optical fiber in one or more holding trays. The grippers, for example, may be rotated while secured to the optical fiber to accomplish the above turning and/or twisting and/or detwisting operations. Alternatively, one or more of the above described standard roller system, pulley system, and/or pneumatic system may also be used for this function.

Figure 14:
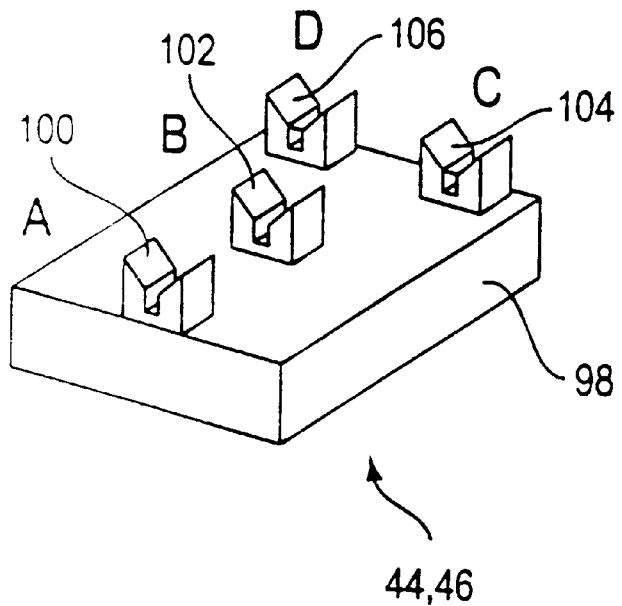
FIG. 14 is an illustration of a holding stage used to hold and position one or more optical fibers for the production and packaging of a fiber optic device in accordance with the present invention.

FIG. 14 is an illustration of a holding stage used to hold and position one or more optical fibers for the production and packaging of fiber optic devices in accordance with the present invention. The holding stage 44, 46 is used to hold and position the optical fibers for the production and packaging of the fiber optic device, such as the coupler.

The holding stage 44, 46 is comprised of four clamps labeled A→D (reference numerals 100, 102, 104, 106) secured to a movable based 98. Clamp A (reference numeral 100) is fixed to the base 98, and is used for the ultra-precise alignment of the optical fibers during the production of the fiber optic device. Clamp B (reference numeral 102) can be moved vertically, and is used for the precise positioning and alignment of the optical fibers during the packaging of the coupler, but may not be as precise as clamp A (reference numeral 100).

Clamps C and D (reference numeral 104, 106) can be moved vertically and horizontally, and are used for the positioning and the alignment of the optical fibers during stripping, and for insertion of the optical fibers into clamps A and B (reference numerals 100, 102). Clamps A and B (reference numerals 100, 102) may hold, for example, a stripped section of both optical fibers, while clamps C and D (reference numerals 104, 106) may hold, for example, a coated section of one optical fiber possibly in cooperation with clamp B (reference numeral 104) holding, for example, an uncoated section of the optical fiber. The holding stages 44, 46 may be mirror images of each other, with clamps A (reference numeral 100) of both holding stages 44, 46 facing each other. Clamps C and D on one or more holding stages may also be used to independently and/or dependently move, for example, horizontally during fiber optic device production to allow independent control and/or adjustment of the position and/or rate of stretching and/or rate of production for each optical fiber(s) and/or a portion thereof of the fiber optic device being formed.

Figure 15:
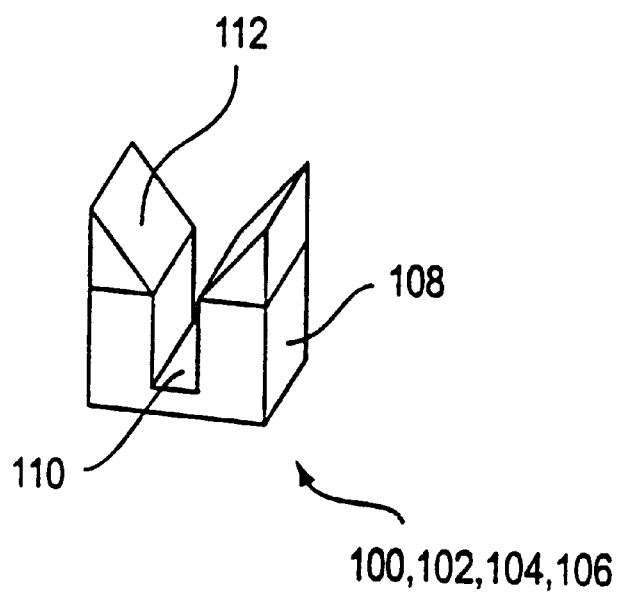
FIG. 15 is an illustration of a holding stage clamp in accordance with the present invention.

FIG. 15 is an illustration of a holding stage clamp in accordance with the present invention. Clamp 100, 102, 104 and/or 106 may be comprised of base 108 with a vertical groove 110 used to align, position, and secure the optical fibers, one above the other, and slopes 112, on either side of the vertical groove 110, used to gently guide the optical fibers into the vertical groove 110.

After an optical fiber has been inserted into the vertical groove 110, the width of the vertical groove 110 may be changed to match the width of, and secure, the optical fiber. The bottom and/or sides of the vertical groove optionally have a series of vacuum ports that may be used to further secure the optical fiber. The clamp can hold multiple optical fibers, as would generally be the case for clamps A and B (reference numerals 100, 102), as well as hold a single optical fiber as would generally be the case for clamps C and D (reference numerals 104, 106). The clamp can hold coated or stripped sections of optical fiber, as well as optical fibers of various diameters.

Of course, other configurations and/or numbers (more or less) of clamps 100, 102, 104, 106, and holding stages 44, 46 may also be used. For example, clamps 100, 102, 104, 106 may comprise the clamp described in U.S. Pat. No. 5,395,101, incorporated herein by reference. Alternatively, clamps 100, 102, 104, 106 can be of any suitable clamp sold by, for example, Fiber Instrument Sales, Inc., 161 Clear Road, Oriskany, N.Y. 13424, the catalog of which is submitted herewith, and incorporated herein by reference. Examples include Connector & Cable clamp, part # F1-6209 and/or the Opti-Grip device, incorporated herein by reference.

Figure 16:
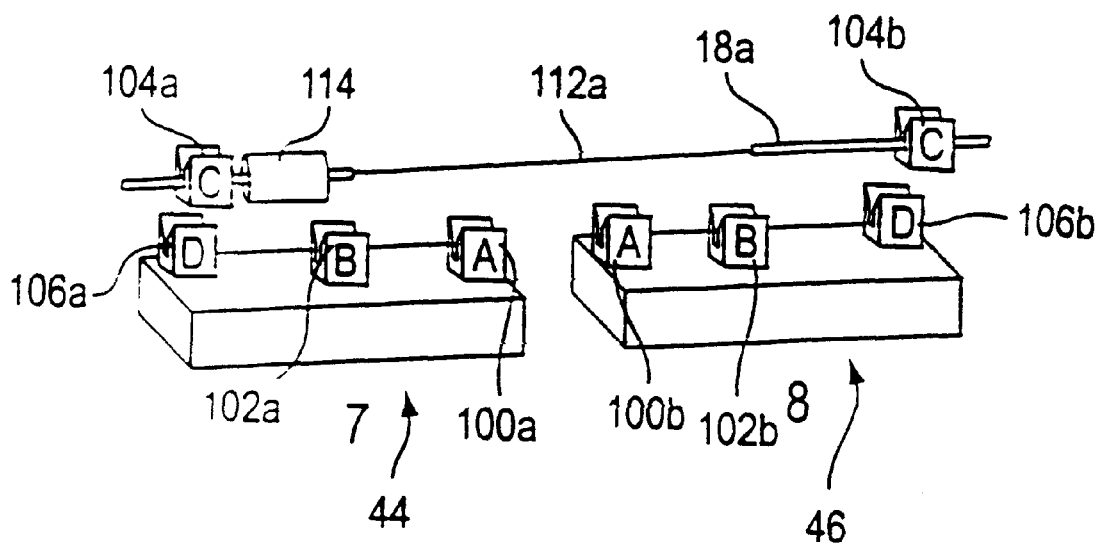
FIG. 16 is an illustration of a first optical fiber being prepared and initially positioned within the clamps on the holding stages illustrated in FIGS. 14–15.

FIG. 16 is an illustration of a first optical fiber being prepared and initially positioned within the clamps on the holding stages illustrated in FIGS. 14–15. The first optical fiber, that has been transported and/or positioned with the assistance of the one or more grippers described above, now must be prepared and initially positioned within the clamps on the holding stages 44, 46. This is accomplished by raising clamps C (reference numerals 104a, 104b) on the two holding stages 44, 46 with or without the assistance of the gripper(s), positioning and securing the coated optical fiber 18a within the clamps 104a, 104b, and then stripping, as described above, a section 112a of coated optical fiber 18a that is between the two clamps 104a–104b.

Any pre-threaded and/or threaded components required for packaging 114 (shown as, for example, the cylinder) may be positioned between clamps C, D (reference numerals 104a, 104b, 106a, 106b) and clamp B (reference numerals 102a, 102b) during stripping. Component 114 is omitted from some of the drawings presented below for clarity. As described below, the components required for packaging 114 may also be positioned and supported between clamp B (reference numerals 102a, 102b) and clamp A (reference numerals 100a, 100b) when the optical fiber(s) 18a is positioned within the other clamps on the holding stages 44, 46.

Component 114 may be pre-threaded on one or more optical fibers used in the process described herein. Alternatively, any method of threading the one or more optical fibers with one or more packaging components may be used. For example, the grippers described above, may be used to thread the optical fiber with the desired components used in the packaging process that cannot otherwise be placed, and/or packaged, on the fiber optic device produced. For example, the packaging may be disposed between two grippers, where the first gripper is used to insert and/or thread the optical fiber into and/or through the packaging and into the second gripper where the optical fiber may subsequently also be secured. This inserting and/or threading may be accomplished, for example, as described above, by the first gripper securing to, advancing and thereby pushing the optical fiber through the packaging and into the second gripper. In this example, a sufficient amount of optical fiber may protrude from the first gripper to allow the optical fiber to be inserted into and/or through the packaging and into and/or through the second gripper for securing thereto.

When the first gripper includes an internal optical fiber advancing system described above, for example, a pulley system, a roller system, a servo system and/or a pneumatic system, the first gripper may remain substantially stationary and advance the optical fiber using this internal optical fiber advancing system. This method may also be used to advance a sufficient amount of the optical fiber for insertion into and/or through the packaging and/or the second gripper.

On the other hand, any number of grippers may be used to accomplish the insertion of the optical fiber into the packaging and/or advancing a sufficient amount of the optical fiber for insertion into and/or through the packaging and/or grippers. For example, a third gripper may be used to push the optical fiber into and/or through the first gripper for insertion into and/or through the packaging and/or the second gripper. In this example, the first gripper may be used substantially as a positioning and/or guiding mechanism.

The use of one or more grippers and/or combinations of grippers and/or gripper/gripping actions beneficially provides an unlimited number of options for the transporting and/or conveying and/or guiding and/or controlling and/or positioning of the optical fiber and/or a portion thereof throughout the production process. In addition, the use of one or more clamps and/or combinations of clamps and/or clamp/clamping actions beneficially provides an unlimited number of options for the guiding and/or controlling and/or positioning of the optical fiber and/or a portion thereof throughout the production process.

Figure 17:
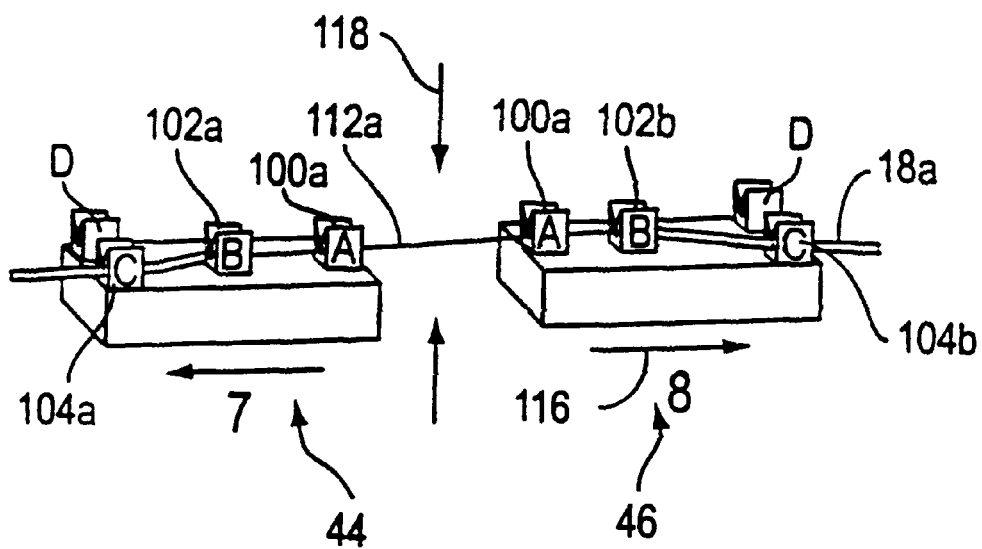
FIG. 17 is an illustration of a first optical fiber being prepared where clamps C on the two holding stages descend, guiding the stripped portion of the optical fiber into clamps A and B.

FIG. 17 is an illustration of a first optical fiber being positioned and/or prepared where clamps C on the two holding stages descend, guiding the stripped portion of the optical fiber into clamps A and B. In FIG. 17, clamps C (reference numerals 104a, 104b) on the two holding stages 44, 46 descends, guiding the stripped portion 112a of the optical fiber 18a between clamps B (reference :numerals 102a, 102b) and clamps A (reference numerals 100a, 100b) on the same holding stage 44, 46, where it is secured, as well as between clamps A (reference numerals 100a, 100b) on opposite holding stages 44, 46.

If the production of the fiber optic device, such as a coupler, requires a pre-taper step, this may be accomplished, as shown via reference numeral 118, by heating a portion of the stripped section 112a of the optical fiber 18a between clamps A (reference numerals 100a, 100b) on opposite holding stages 44, 46, and moving the holding stages 44, 46 apart designated by reference numeral 116. In addition, other operations, for example, an optional pre-twisting operation for the optical fiber, can also be performed at this stage of the process described herein.

Figure 18:
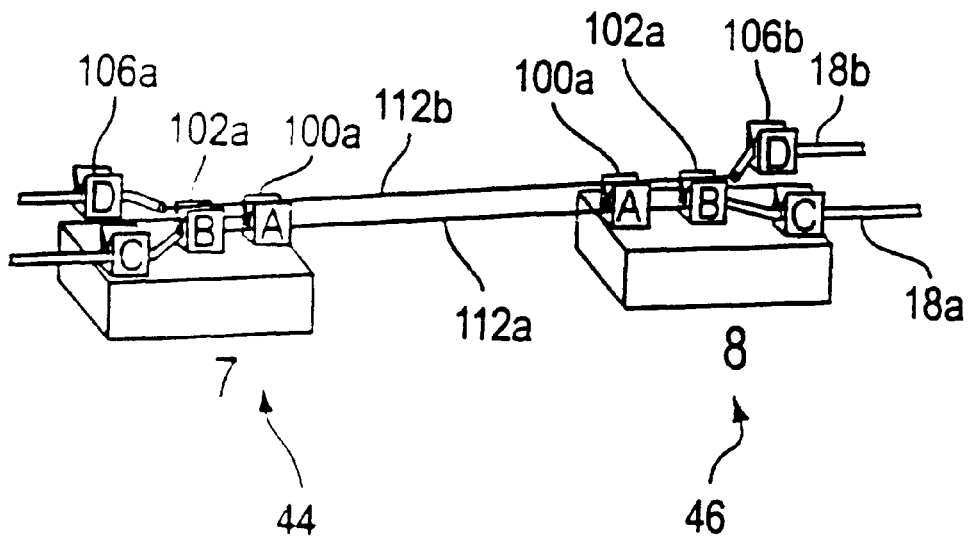
FIG. 18 is an illustration of a second optical fiber that has a stripped portion being prepared where clamps D on the two holding stages are lowered, guiding the second optical fiber into clamps A and B.

FIG. 18 is an illustration of a second optical fiber, having already undergone a process similar to the process described above in FIG. 16 for clamp C, that has a stripped portion being positioned and/or prepared where clamps D on the two holding stages are lowered, guiding the second optical fiber into clamps A and B, in a process similar to the process described above in FIG. 17 for clamp C. Clamps D (reference numerals 106a, 106b) on the two holding stages 44, 46 are raised, the second optical fiber 18b, optionally pre-threaded and/or threaded with the same and/or different packaging components in accordance with the process described above, is positioned and secured within the clamps D (reference numerals 106a, 106b), and a section 112b of the coated optical fiber 18b, between the two clamps D (reference numerals 106a, 106b) is stripped.

The clamps D (reference numerals 106a, 106b) descend, guiding the stripped portion of the coated optical fiber 18b, into clamps A and B (between reference numerals 100a–102a, 100b–102b respectively), directly above the secured first optical fiber 18a. The second optical fiber is then also secured within clamps A and B (reference numerals 100a, 100b, 102a, 102b), bringing the stripped sections 112a, 112b of optical fibers 18a, 18b, between clamps A (reference numerals 100a, 100b) on the two holding stages 44, 46 into close contact with each other.

An optional pre-twisting operation for both optical fibers 18a, 18b, to twist around each other, can also be performed at this stage of the process described herein, for example, by the twisting device described in the Dissertation, submitted herewith and incorporated herein by reference.

Advantageously, the production set up and/or positioning and/or configuration of holding stages 44, 46 is designed, as will be further described below, to be able to be positioned close together, for example, closer together than the length of the packaging that may later be applied to the device formed by the apparatus and process described herein. This close spacing between holding stages 44, 46 facilitates accurate alignment and/or control between optical fibers 18a, 18b. The resulting fiber optic device produced by the apparatus and/or process described herein is of a high quality with respect to desired optical properties, and/or characteristics.

Figure 19:
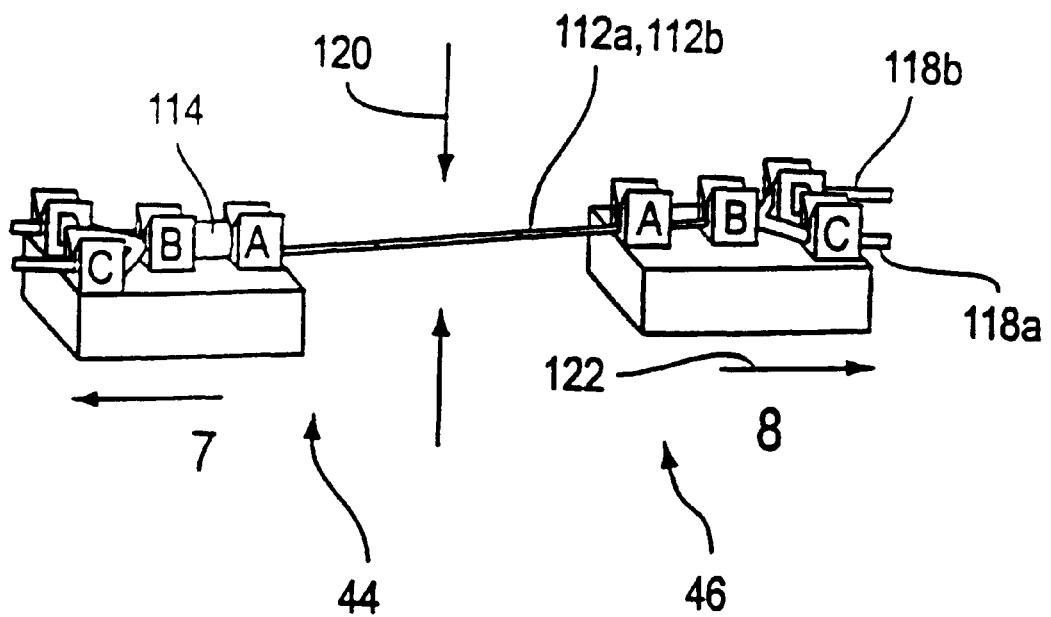
FIG. 19 is an illustration of the first and second optical fibers in position within the holding stages for production of the fiber optic device.

FIG. 19 is an illustration of the first and second optical fibers 18a, 18b, in position within the holding stages 44, 46 for production of the fiber optic device. The optical fibers 18a, 18b, are now in position within the holding stages 44, 46 for production of the fiber optic device, for example, a coupler. The coupler may be produced by heating (designated by reference numeral 120) and fusing together a portion of the stripped section 112a, 112b of the optical fibers 18a, 18b, and moving the holding stages apart (designated by reference numeral 122), which stretches the fused region of the optical fibers 18a, 18b, and forms a biconical taper.

Advantageously, the combination of clamps A, B, C and D work in various combinations to provide the function of positioning the optical fibers in the appropriate location, to facilitate the reliable and/or accurate production process described herein. For example, clamps C and D are used in combination to clamp and/or brace the cabled and/or sheathed and/or coated portions of the optical fibers 18a, 18b. Clamps C and D thus brace the optical fibers 18a, 18b, quite securely, but are not generally used for positioning the optical fibers 18a, 18b, in close proximity of one another.

Clamps A and B are used for positioning a stripped portion of optical fibers 18a, 18b, after stripping, in close proximity of one another. In addition, clamp B is used in conjunction with clamps C and D to elevate the optical fibers 18a, 18b. Accordingly, clamp B is not generally used by itself for ultra-precise and/or final alignment of the optical fibers 18a, 18b, next to each other. On the other hand, clamp A is substantially fixed to the holding stages 44, 46, and therefore, is used for ultra-precise and/or fine positioning of stripped optical fibers 18a, 18b, to each other for the production process.

In addition, the optical changes of the fiber optic device can be monitored using the optical sources 22 and detectors 40, described in detail above. The production process of the fiber optic device, for example, the pulling and/or heating, may then be terminated when the desired optical properties are achieved or present in the fiber optic device. See, U.S. application 08/833,119, entitled "APPARATUS AND METHOD FOR CONTROLLED HEATING AND DEFORMING OF AN OPTIC FIBER," filed on Apr. 14, 1997, for a more detailed illustration of one possible technique for coupler production, incorporated herein by reference.

Further, multiple fiber optic production processes and/or fiber optic devices may be tested in accordance with the testing apparatus described in U.S. application entitled "APPARATUS AND METHOD FOR TESTING OPTICAL FIBER SYSTEM COMPONENTS," filed on Jun. 27, 1997 (attorney docket 2986-003A), incorporated herein by reference, and combined herewith. This testing apparatus permits multiple devices under test to be tested, or permits multiple tests to be performed on a device under test. For example, the optical fibers immediately after optical sources 22 and/or the optical fibers just prior to detectors 40 may be considered leads for the fiber optic device.

Figure 20:
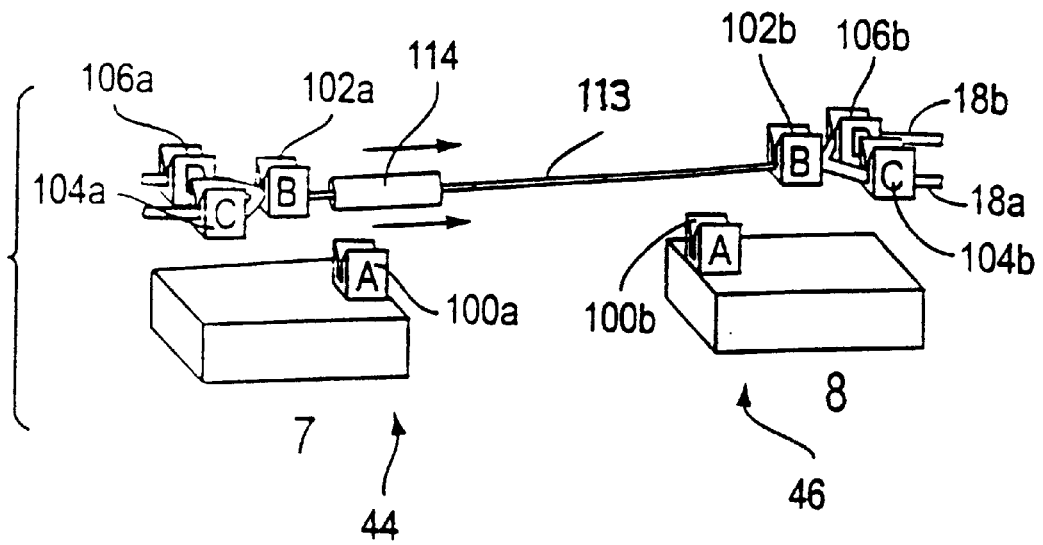
FIG. 20 is an illustration of the completed fiber optic device being prepared to be packaged without inducing stress or optical changes.

FIG. 20 is an illustration of the completed fiber optic device being prepared to be packaged without inducing stress or optical changes. In FIG. 20, after production is substantially completed, the fragile coupler at fused region 113 must be packaged without inducing substantial amounts of stress and/or substantial amounts of optical changes. This is accomplished by, for example, first raising clamps B, C and D (reference numerals 102a, 104a, 106a) on holding stage 44 simultaneously and/or substantially together with clamps B, C and D (reference numerals 102b, 104b, 106b) on holding stage 46, which guides the optical fibers 18a, 18b, out of, and raises them above, clamps A (reference numerals 100a, 100b).

This allows the positioning of any threaded and/or pre-threaded components, for example, cylinder 114, that may be required for packaging the fiber optic device produced previously, and having optical fibers 18a, 18b, threaded therethrough. Advantageously, the ability to temporarily store any threaded and/or pre-threaded and/or desired packaging components between clamps A and B (between, for example, reference numerals 100a–102a, and/or 100b–102b), optionally allows the holding stages 44, 46 to be positioned closer together than the length of the packaging used herein, providing, for example, the further advantages described above relating to accurate alignment and/or control. The fiber optic device may then be packaged possibly using any stored packaging components. See, for example, U.S. application entitled "APPARATUS AND METHOD BONDING OPTICAL FIBER AND/OR DEVICE TO EXTERNAL ELEMENT USING COMPLIANT MATERIAL INTERFACE," filed on May 30, 1997 (attorney docket 2986-005A); U.S. Pat. Nos. 5,602,952; 5,367,591; and/or 4,714,316, for a detailed illustration of possible techniques for coupler packaging, incorporated herein by reference.

Figure 21:
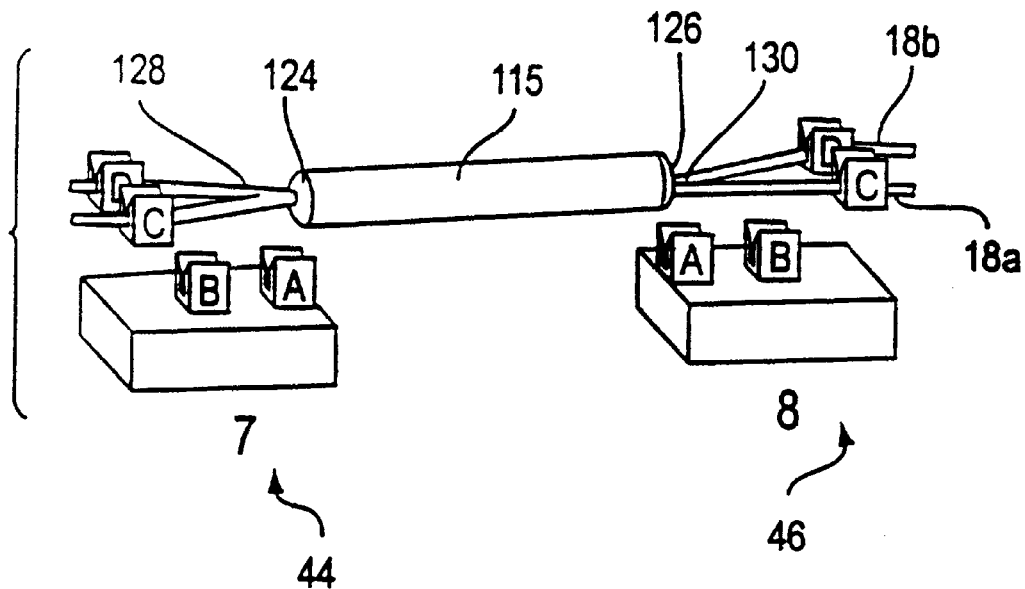
FIG. 21 is an illustration of the completed and packaged fiber optic device, ready to be transported for additional processing.

FIG. 21 is an illustration of the completed and packaged fiber optic device, ready to be transported for additional processing. The packaged coupler 115 (shown as the cylinder) includes coated optical fiber pairs 128, 130 exiting from sealed ends 124, 126, respectively. Sealed ends 124, 126 may have been sealed, for example, using any suitable material, such as an epoxy, and the like. If desired, any remaining exposed stripped areas of optical fibers 18a, 18b, may be, for example, beneficially spray coated with a standard reinforcing coating, for example, using any standard process. To facilitate the spray coating process, the fiber optic device 115 may be secured by, for example, only using clamps C (reference numerals 104a, 104b) and/or clamps D (reference numerals 106a, 106b), as shown in FIG. 21. The packaged fiber optic device is now ready to be transported, for example, for additional processing and/or testing, and/or use.

Figure 22:
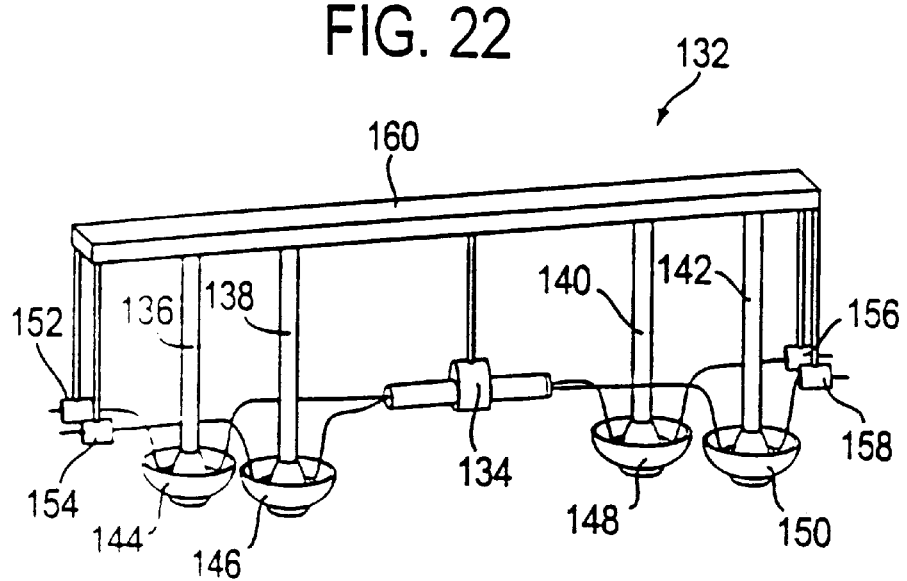
FIG. 22 is an illustration of a transport device in accordance with a first embodiment used to transport the packaged fiber optic device.

FIG. 22 is an illustration of a transport device in accordance with a first embodiment used to transport the packaged fiber optic device. To transport the packaged fiber optic device, a transport device 132, under the control of a standard conveying device, for example, a standard overhead gantry, may be used. Transport device 132 has a clamp 134 to secure the packaged fiber optic device, a set of attachments 136, 138, 140, 142 to secure the fiber optic device lead holding trays 144, 146, 148, 150, respectively. In addition, transport device 132 includes a set of clamps 152, 154, 156, 158 to secure the ends of the fiber optic device leads. A support bar 160 holds the clamps 134, 152, 154, 156, 158 and attachments 136, 138, 140, 142 in a precise position and/or in a predetermined/known position and/or relative position.

The number of attachments and/or clamps can be altered to suit the needs of the different fiber optic devices manufactured by the apparatus and/or process described herein. Further, the specific lengths of the clamps and/or attachments may also be varied to suit different fiber optic devices. The support bar is only one example of stabilizing the clamps to a common substrate, and other configurations, such as a combination of support bars, a support bar not being completely planar, and the like, are also possible.

After the transport device 132 has secured the fiber optic device by, for example, being lowered from above, the optical fibers are then cut, and the transport device 132 removes the fiber optic device from the apparatus. The excess optical fiber within the apparatus may be removed, new fiber optic device lead holding trays may be positioned, and the apparatus is ready to produce the next fiber optic device. The transport device 132 can now be used to move the fiber optic device to and/or between additional stations where it can be optically tested, spliced, connectorized, and/or placed on holding trays together with other couplers for temperature cycle burn-in testing, and the like.

See, for example, U.S. application entitled "APPARATUS AND METHOD FOR TESTING OPTICAL FIBER SYSTEM COMPONENTS," filed on Jun. 27, 1997 (attorney docket 2986-003A), incorporated herein by reference for a more detailed illustration of one possible technique for coupler optical testing. Advantageously, standard automated fusion splicers and/or automated strippers and/or automated cleavers may be used in combination with this testing apparatus to automatically splice the leads of the fiber optic device positioned by the transport device 132 to the leads of the testing apparatus. See, for example, U.S. application entitled "APPARATUS FOR, AND METHOD OF, FORMING A LOW STRESS TIGHT FIT OF AN OPTICAL FIBER TO AN EXTERNAL ELEMENT," filed on Jun. 20, 1997 (attorney docket 2986-004A), and U.S. application entitled "APPARATUS FOR, AND METHOD OF, FORMING A LOW STRESS TIGHT FIT OF AN OPTICAL FIBER TO AN EXTERNAL ELEMENT," filed on Jun. 30, 1997 (attorney docket 2986-004B), which are incorporated herein by reference, for a more detailed illustration of possible techniques for attaching connectors. See, for example, U.S. Pat. Nos. 5,239,604; 5,381,497; 5,293,582; 5,261,019; 5,475,784; 5,066,149; 4,701,010; 4,611,884; and the devices sold by Fiber Instrument Sales, Inc., 161 Clear Road, Oriskany, N.Y. 13424, incorporated herein by reference, for examples of various connection devices, optical fiber couplers, and/or optical fiber crimps that may also be used by the apparatus and/or process described herein. The grippers and/or transport device may be used to control the ends and/or loose/unsecured optical fiber and/or a portion of the optical fiber of the fiber optic device for securing and/or connecting to components. For example, a gripper and/or the transport device and/or a portion thereof, may be used to thread the optical fiber into a ferrule and/or connector components onto each other, to produce the connector.

Transport device 132 advantageously is able to stabilize the ends and/or leads and/or some portion thereof, of the fiber optic device for positioning into, for example, additional stations where the fiber optic device can be optically tested, connectorized if required, and/or placed on holding trays with similar automated clamping features as described above, together with other couplers, to automatically connect and/or secure to the ends of the fiber optic device(s), for individual and/or mass temperature cycle burn-in testing, and the like, by, for example, automated insertion and/or removal of the holding trays into/from, for example, an oven. The temperature cycle burn-in testing apparatus and/or holding trays and/or testing apparatus and/or other apparatus used in the production process and the like, maintain the ends of the fiber optic device in, for example, a known configuration as described above, to enable subsequent removal therefrom via, for example, the transport device 132. Of course, transport device 132 may be used to remove the fiber optic device from, for example, the temperature cycle burn-in testing apparatus and/or holding trays as well for subsequent processing and/or packaging and/or testing. The additional fiber optic device leads in optional lead spooling trays may be unspooled, and further used in the production process as described above.

In addition to, and/or instead of, removing the processed fiber optic device, transport device 132 may optionally be used to position the ends and/or a portion thereof of the optical fibers into the production apparatus, for example, the sealed chamber, for subsequent fiber optic device production. That is, the optical fibers may be, for example, coiled into holding trays 144, 146, 148, 150 and/or may have stripped and/or cleaved one or more portions, such as the end(s) and/or the area to be fused and/or processed. In this production setup, the grippers may, for example, be eliminated and substituted in structure and/or function with the transport device 132. The optical fibers may be strung across and/or held in position and/or relative position from holding tray to holding tray, and/or positioned with one or more clamps, for example clamp 134, of the transport device 132, onto and/or for positioning and/or securing onto the holding stages for subsequent fiber optic device production. The clamps on transport device 132 used to position and/or secure the ends of the optical fibers, for example clamps 152, 154, 156, 158, may also be used to position and/or hold in position and/or relative position the optical fiber ends for subsequent connection to any desired optical sources and/or detectors and/or additional grippers, for example as described above. Transport device 132 may then, for example, be removed or left in position during the fiber optic device production process, and/or possibly used for transporting the fiber optic device after production as described above. Accordingly, one possible modification of the production apparatus illustrated in FIG. 2 may be to use the grippers with the holding trays and/or despooling mechanism to position the optical fiber and/or create optical fiber leads in one production setup, and have the transport device transport the optical fibers and/or coiled leads to a second production setup that may, for example, include holding stages 44, 46 for fiber optic device production.

Alternatively, the second production setup may, for example, attach a connector(s) to one or more ends of the optical fiber(s) and/or place and attach the coiled optical fiber(s) in or possibly in a holding tray(s) to other components. The other components may also be secured by one or more transport devices. For example, in this manner, the transport device may be used to create a fiber optic amplifier as described below in more detail.

Transport device 132, based, for example, on its known and/or defined relationships between its attachments and/or clamps, is capable of, for example, accurately and/or reliably positioning the ends and/or leads and/or some portion thereof, of the fiber optic device to a subsequent stage of the production and/or packaging and/or testing process capable and/or modified for automated reception of same from and/or removal of same by and/or to the transport device 132.

Figure 23:
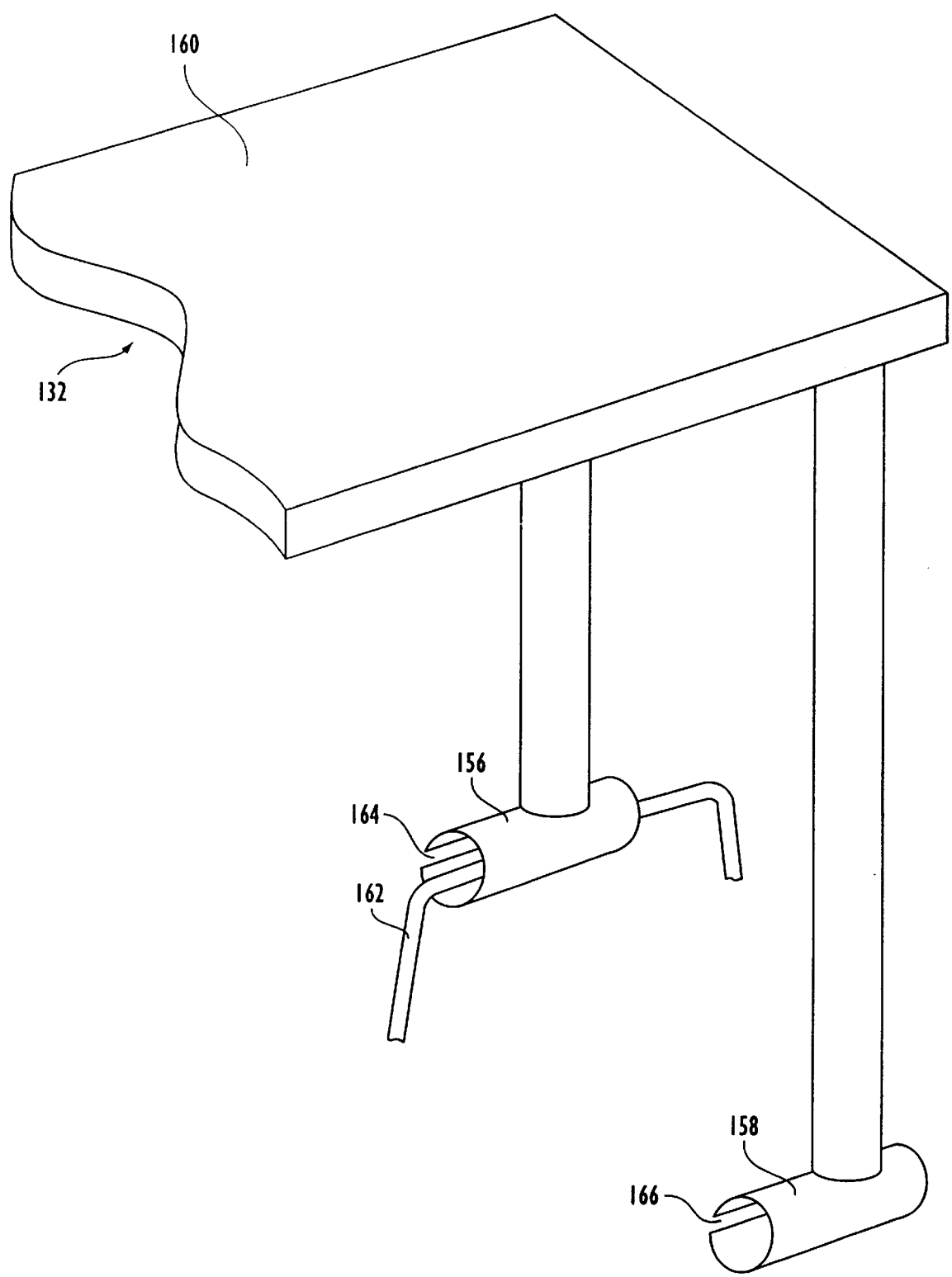
FIG. 23 is an illustration of an enlarged view of the transport device illustrated in FIG. 22, in accordance with a first embodiment used to transport the packaged fiber optic device.

FIG. 23 is an illustration of a partial enlarged view of the transport device illustrated in FIG. 22, in accordance with a first embodiment used to transport the packaged fiber optic device. In FIG. 23, transport device 132 includes base section 160 supporting clamps 156, 158. Clamps 156, 158 are stationary clamps having entrances and/or passages 164, 166, respectively. Optical fiber 162 is clamped by clamp 156 for illustrative purposes. The entrances 164, 166 may be designed such that they are located along the side of clamps 156, 158 to facilitate retention of the optical fibers therein.

FIG. 24 is an illustration of a partial enlarged view of the transport device illustrated in FIG. 22, in accordance with a second embodiment used to transport the packaged fiber optic device. In FIG. 24, transport device 168 includes base section 198 supporting clamp assemblies 170, 184. Clamp assemblies 170, 184 may be mobile and/or variable clamps. Clamp assembly 170 may be hinged via, for example, hinged, variable diameter entrance and/or clamp 172 via hinge(s) 174. Clamp 172 may also be rotatable around its axis via rotation section 176, and movable in the up/down direction via sections 178, 180. Clamp 172 may also be transportable in the horizontal direction via element 182 that may travel in slot 200.

Clamp assembly 184 may be hinged via, for example, hinged, variable diameter entrance and/or clamp 186 via hinge(s) 188. Clamp 186 may also be rotatable around its axis via rotation section 190, and movable in the up/down direction via sections 192, 194. Clamp 186 may also be transportable in the horizontal direction via element 196 that may travel in slot 200. The entrances of clamps 172, 186 used to secure to an optical fiber may be designed such that they are located along the side of clamps 172, 186 to facilitate retention of the optical fibers therein.

As indicated above, the number of attachments and/or clamps can be altered to suit the needs of the different fiber optic devices manufactured by the apparatus and/or process described herein. Further, the specific lengths of the clamps and/or attachments may also be varied to suit different fiber optic devices. The support bar is only one example of stabilizing the clamps to a common substrate, and other configurations, such as a combination of support bars, a support bar not being completely planar, and the like, are also possible. The variable/rotary sections can be used in various combinations and/or separately, depending on the fiber optic device to be transported. Of course, any suitable clamp may be used of any configuration and/or design to secure to the ends and/or a portion thereof of the fiber optic device.

Figure 25:
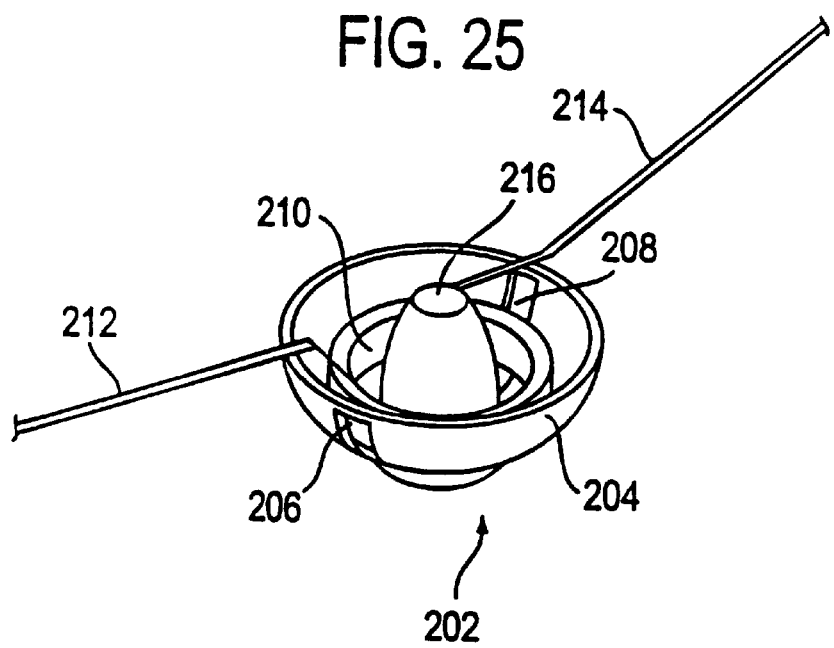
FIG. 25 is an illustration of a fiber optic lead holding tray containing a coupler lead.

FIG. 25 is an illustration of a fiber optic lead holding tray containing an optical fiber lead. Lead holding tray 202 contains a saucer area 204 housing and/or supporting an optical fiber/coupler lead 210. The two slits/apertures 206, 208 on either side of the saucer 204 allow the looped optical fiber/coupler lead 210 to be secured with cable ties, shown below. Optical fiber sections 212, 214 exit from the upper area of the saucer 204, and are not threaded through apertures 206, 208, to facilitate removal of the optical fiber lead from holding tray 202.

Holding tray 202 advantageously further includes an external connection area 216, designed and/or configured for connection to the transport device described above. Connection area 216 may be, for example, a cavity for receiving a section of the transport device as illustrated, or any other suitable device and/or configuration that permits the transport device to connect to the holding tray, permanently and/or temporarily, for subsequent transport to another stage of the production process.

Other configurations and/or numbers of apertures 206, 208 may also be used that facilitate and/or permit the optical fiber lead to be tied and/or fastened and/or secured. Further, other types and/or numbers of fasteners may be used in place of the standard cable tie. The holding tray is shaped to facilitate the self-coiling of the optical fiber therein; however, other shapes of the holding tray may also be used. For example, the wire stacker/coiling pan WS 1500/CP 1250 manufactured by Schleuniger, Inc., 150 Dow Street, Tower Four, Manchester, N.H. 03101 may be used. Alternatively, the coiling pan CP 1200 manufactured by Schleuniger may also be used.

Figure 26:
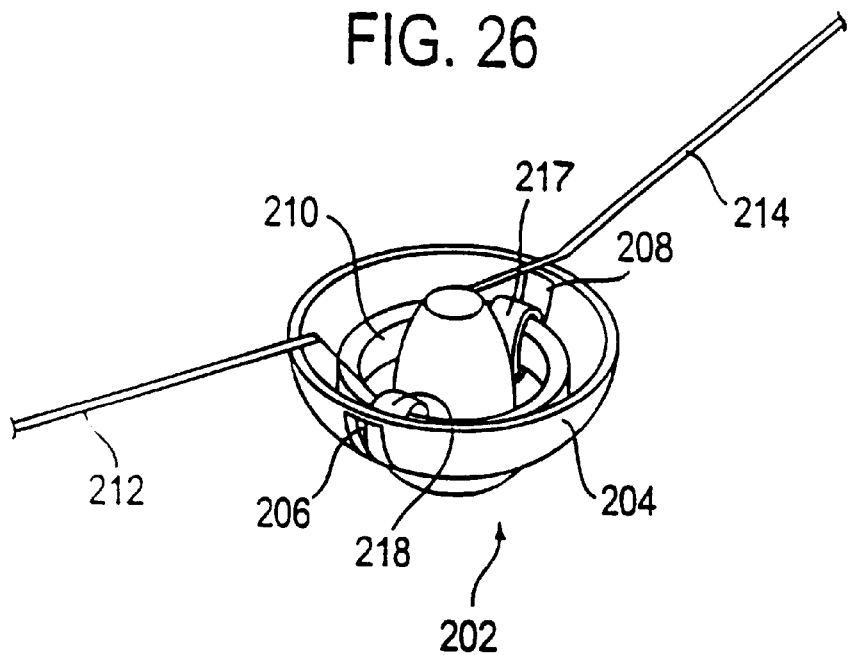
FIG. 26 is an illustration of a fiber optic lead holding tray containing a coupler lead secured with cable ties.

FIG. 26 is an illustration of a fiber optic lead holding tray containing a coupler lead secured with cable ties. In FIG. 26, optical fiber/coupler lead holding tray 202 contains an optical fiber lead 210 secured with, for example, cable ties 217, 218 (shown around the looped optical fiber lead 210). Of course, the securing of the optical fiber lead 210 with the cable ties 217, 218 can be done at any point in the production process. The optical fiber lead 210 can optionally be removed in a controlled and/or stabilized manner from the holding tray 202.

Figure 27:
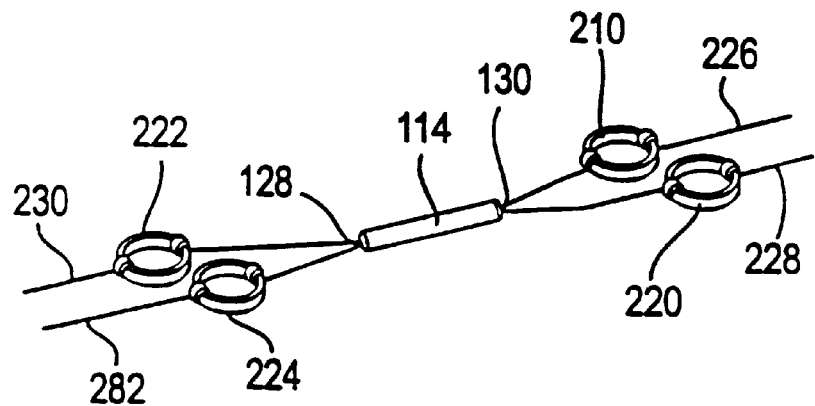
FIG. 27 is an illustration of a fiber optic device with leads secured, and ready for further packaging, labeling, and shipping.

FIG. 27 is an illustration of a fiber optic device with leads secured, and ready for any further testing, packaging, labeling, and/or shipping, and the like. For example, the fiber optic device(s) and/or groups of same may be secured within and/or inserted into a shipping container, and thereafter, the shipping container sealed, labeled, transported, processed and/or shipped to a customer in a standard manner. One example of a device suitable for use in the packaging, labeling and shipping of the resulting fiber optic device are the machines manufactured by A-B-C Packaging Machine Corporation of 811 Live Oak Street, Tarpon Springs, Fla. 34689. The resulting fiber optic device may have been packaged via packaging 114 with coated optical fibers 128, 130 exiting from its sealed ends. The sealed ends may have been sealed using any suitable material, such as an epoxy, and the like. Looped optical fiber leads 210, 220, 222, 224 include respective leads 226, 228, 230, 232 used for further packaging, testing, production, and the like. The number of optical fiber leads is only exemplary, and may be used and/or varied as desired, depending on the fiber optic device being manufactured, user specific preferences, and the like.

Other configurations of packaging and/or connection elements can be used. The packaging may dictate whether the optical fiber is inserted within and/or into cusps and/or a connection element(s) and/or assembly and/or a ferrule. Other methods of inserting the optical fiber into the production process for stabilization and/or testing and/or packaging may be used.

All of the above components, optical fiber(s), fiber optic device(s), and/or transport device, in the production process of the present invention may advantageously be under the control and/or supervision of standard controllers used for coordination and/or transportation and/or processing the optical fiber(s) into the fiber optic device. Further, the entire production, testing, packaging, labeling, and/or shipping, and the like can be under the supervision and/or control of one or more controllers.

Such standard controllers may be, for example, computer implemented software controllers programmed to instruct the different components to perform the above described fiber optic production steps. In addition, standard sensors (e.g., optical, visual, positional, force, and, the like) may also be used to, for example, indicate and/or provide the position of one or more components in the production process described herein. Of course, other sensors, for example, environmental sensors (e.g., humidity, particulate, gas), temperature sensors, and/or optical fiber diameter sensors, and the like, may also be used, for example, for monitoring and/or control purposes. Sensors may also, for example, be located on and/or within and/or attached to and/or remotely positioned from the components of the apparatus/method described herein.

Standard actuators and/or motors and/or robot controllers and/or robotic motors, and the like, may be used to move and/or control the movement and/or compress and/or control the action of the various components (e.g., sealed chamber port, grippers, holding stages, holding clamps, holding trays, optical detector, optical source, despooler, and the like). Accordingly, the production process described herein may also utilize and/or comprise, for example, a standard open-loop, feed-back and/or feed-forward control system for production of enhanced and/or high quality fiber optic devices.

Figure 28:
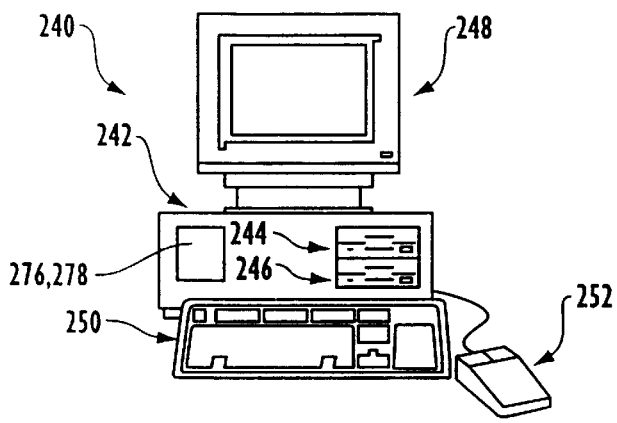
FIG. 28 is an illustration of a main central processing unit for implementing the computer processing in accordance with a computer implemented embodiment of the present invention.

FIG. 28 is an illustration of a main central processing unit for implementing the computer processing in accordance with a computer implemented embodiment of the present invention. The procedures described above may be presented in terms of program procedures executed on, for example, a computer or network of computers.

A procedure is here, and generally, conceived to be a self-consistent sequence of steps leading to a desired result. These steps are those requiring physical manipulations of physical quantities. Usually, though not necessarily, these quantities take the form of electrical or optical or magnetic signals capable of being stored, transferred, combined, compared and otherwise manipulated. It proves convenient at times, principally for reasons of common usage, to refer to these signals as bits, values, elements, symbols, characters, terms, numbers, or the like. "Or," as the term is used herein and throughout this application, means and/or. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

Viewed externally in FIG. 28, a computer system designated by reference numeral 240 has a central processing unit 242 having disk drives 244 and 246. Disk drive indications 244 and 246 are merely symbolic of a number of disk drives which might be accommodated by the computer system. Typically these would include a floppy disk drive such as 244, a hard disk drive (not shown externally) and a CD ROM indicated by slot 246. The number and type of drives varies, typically with different computer configurations. Disk drives 244 and 246 are in fact optional, and for space considerations, may easily be omitted from the computer system used in conjunction with the production process/apparatus described herein.

The computer also has an optional display 248 upon which information is displayed. In some situations, a keyboard 250 and a mouse 252 may be provided as input devices to interface with the central processing unit 242. Then again, for enhanced portability, the keyboard 250 may be either a limited function keyboard or omitted in its entirety. In addition, mouse 252 may be a touch pad control device, or a track ball device, or even omitted in its entirety as well. In addition, the computer system also optionally includes at least one infrared transmitter 276 and/or infrared receiver 278 for either transmitting and/or receiving infrared signals, as described below.

Figure 29:
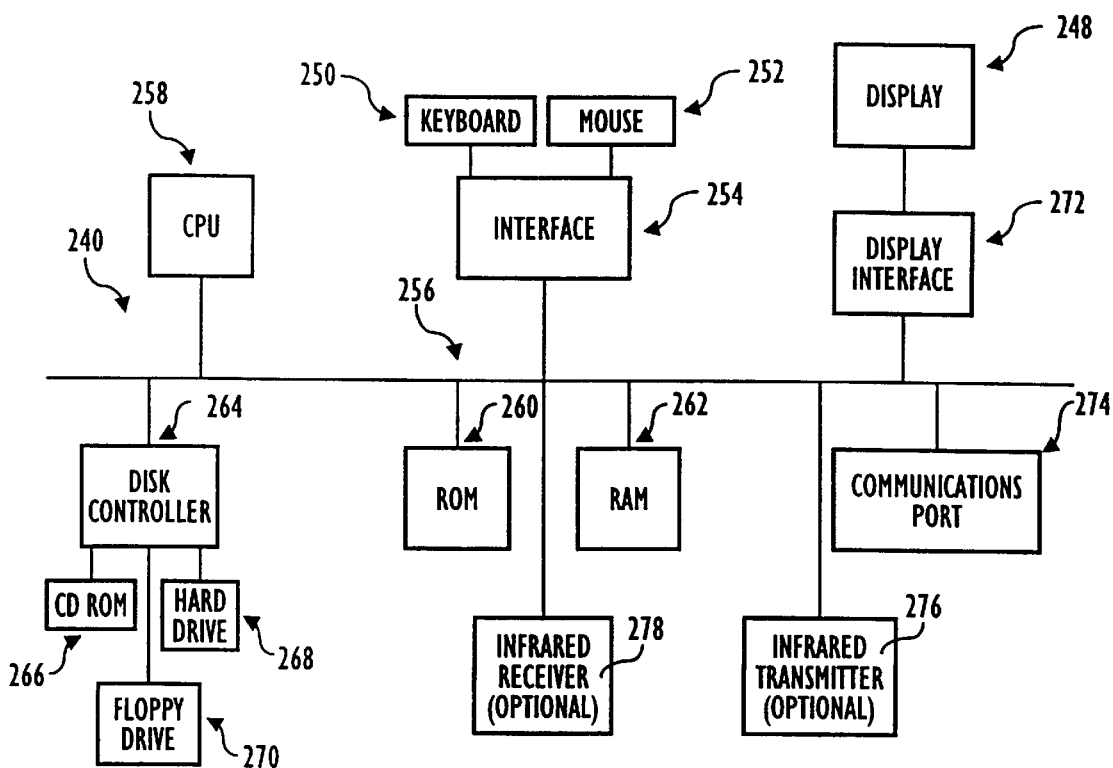
FIG. 29 illustrates a block diagram of the internal hardware of the computer of FIG. 28.

FIG. 29 illustrates a block diagram of the internal hardware of the computer of FIG. 28. A bus 256 serves as the main information highway interconnecting the other components of the computer. CPU 258 is the central processing unit of the system, performing calculations and logic operations required to execute a program. Read only memory (ROM) 260 and random access memory (RAM) 262 constitute the main memory of the computer. Disk controller 264 interfaces one or more disk drives to the system bus 256. These disk drives may be floppy disk drives such as 270, or CD ROM or DVD (digital video disks) drive such as 266, or internal or external hard drives 268. As indicated previously, these various disk drives and disk controllers are optional devices.

A display interface 272 interfaces display 248 and permits information from the bus 256 to be displayed on the display 248. Again as indicated, display 248 is also an optional accessory. For example, display 248 could be substituted or omitted. Communication with external devices, for example, the components of the apparatus described herein, occurs utilizing communication port 274. For example, optical fibers and/or electrical cables and/or conductors and/or optical communication (e.g., infrared, and the like) and/or wireless communication (e.g., radio frequency (RF), and the like) can be used as the transport medium between the external devices and communication port 274.

In addition to the standard components of the computer, the computer also optionally includes at least one of infrared transmitter 276 or infrared receiver 278. Infrared transmitter 276 is utilized when the computer system is used in conjunction with one or more of the processing components/stations of the fiber optic production process that transmits/receives data via infrared signal transmission.

Figure 30:
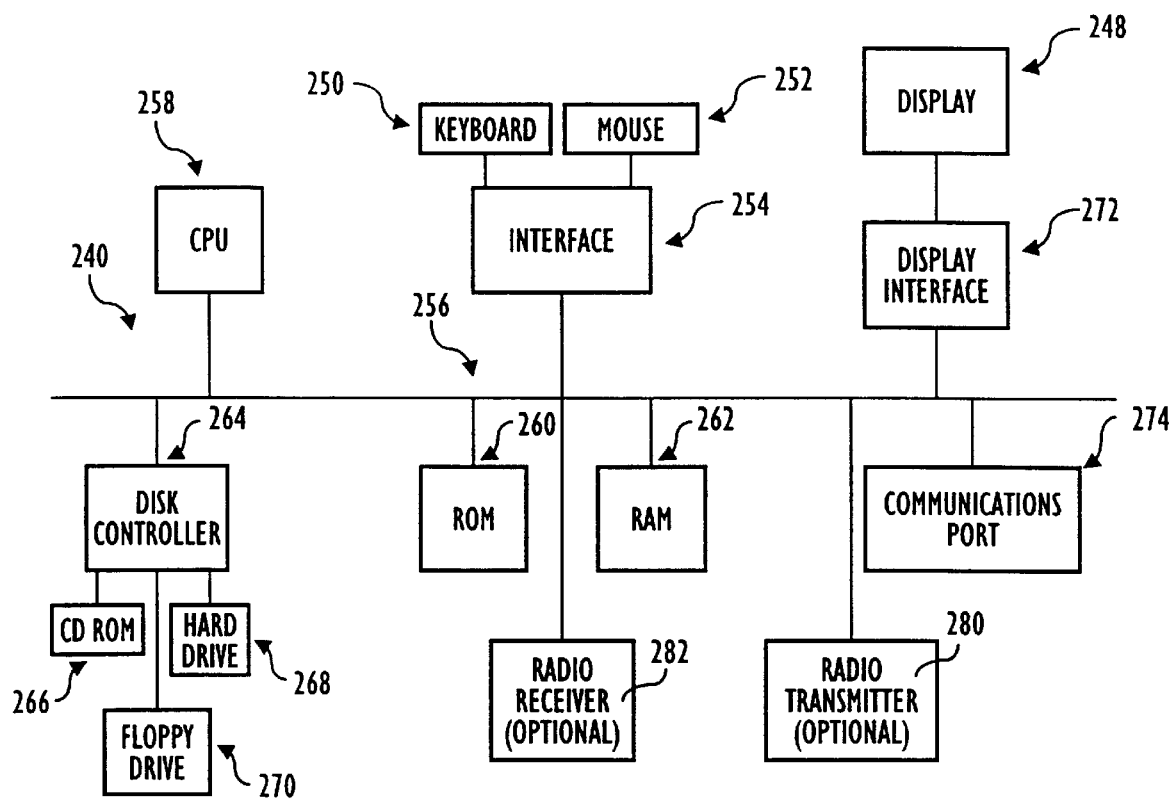
FIG. 30 is a block diagram of the internal hardware of the computer of FIG. 29 in accordance with a second embodiment.

FIG. 30 is a block diagram of the internal hardware of the computer of FIG. 28 in accordance with a second embodiment. In FIG. 30, instead of utilizing an infrared transmitter or infrared receiver, the computer system uses at least one of a low power radio transmitter 280 and/or a low power radio receiver 282. The low power radio transmitter 280 transmits the signal for reception by components of the production process, and receives signals from the components via the low power radio receiver 282. The low power radio transmitter and/or receiver 280, 282 are standard devices in industry.

Figure 31:
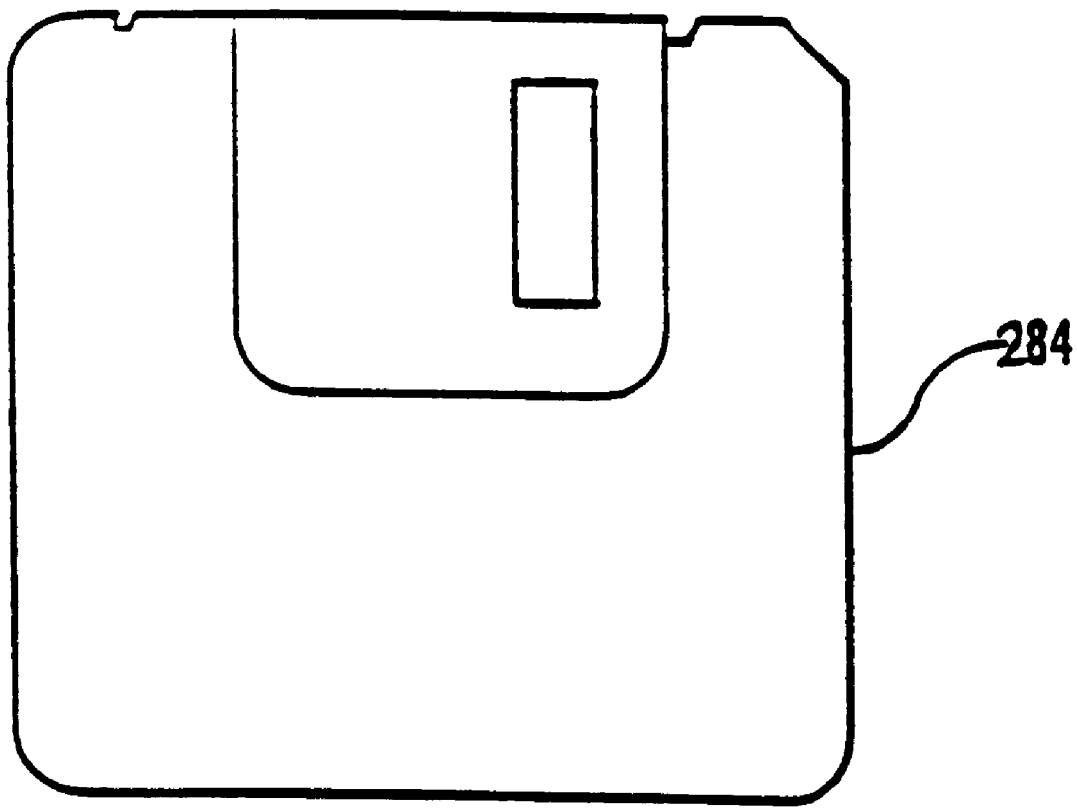
FIG. 31 is an illustration of an exemplary memory medium which can be used with disk drives illustrated in FIGS. 28–30.

FIG. 31 is an illustration of an exemplary memory medium which can be used with disk drives illustrated in FIGS. 28–30. Typically, memory media such as floppy disks, or a CD ROM, or a digital video disk will contain, for example, a multi-byte locale for a single byte language and the program information for controlling the computer to enable the computer to perform the functions described herein. Alternatively, ROM 260 and/or RAM 262 illustrated in FIGS. 29–30 can also be used to store the program information that is used to instruct the central processing unit 258 to perform the operations associated with the production process.

Although processing system 240 is illustrated having a single processor, a single hard disk drive and a single local memory, processing system 240 may suitably be equipped with any multitude or combination of processors or storage devices. Processing system 240 may, in point of fact, be replaced by, or combined with, any suitable processing system operative in accordance with the principles of the present invention, including sophisticated calculators, and hand-held, laptop/notebook, mini, mainframe and super computers, as well as processing system network combinations of the same.

Conventional processing system architecture is more fully discussed in *Computer Organization and Architecture,* by William Stallings, MacMillam Publishing Co. (3rd ed. 1993); conventional processing system network design is more fully discussed in *Data Network Design,* by Darren L. Spohn, McGraw-Hill, Inc. (1993), and conventional data communications is more fully discussed in *Data Communications Principles,* by R. D. Gitlin, J. F. Hayes and S. B. Weinstain, Plenum Press (1992) and in *The Irwin Handbook of Telecommunications,* by James Harry Green, Irwin Professional Publishing (2nd ed. 1992). Each of the foregoing publications is incorporated herein by reference. Alternatively, the hardware configuration may be arranged according to the multiple instruction multiple data (MIMD) multiprocessor format for additional computing efficiency. The details of this form of computer architecture are disclosed in greater detail in, for example, U.S. Pat. No. 5,163,131; Boxer, A., Where Buses Cannot Go, IEEE Spectrum, February 1995, pp. 41–45; and Barroso, L. A. et al., RPM: A Rapid Prototyping Engine for Multiprocessor Systems, IEEE Computer February 1995, pp. 26–34, all of which are incorporated herein by reference.

In alternate preferred embodiments, the above-identified processor, and in particular microprocessing circuit 258, may be replaced by or combined with any other suitable processing circuits, including programmable logic devices, such as PALs (programmable array logic) and PLAs (programmable logic arrays). DSPs (digital signal processors), FPGAs (field programmable gate arrays), ASICs (application specific integrated circuits), VLSIs (very large scale integrated circuits) or the like.

While the above apparatus and/or process has described a technique for producing and/or testing and/or transporting and/or packaging a fiber optic device, the above apparatus and/or process may be used to produce and/or test and/or transport and/or package any optical fiber, device and/or fiber optical device. Further, the above apparatus and/or process may be modified to suit particular connector and/or packaging needs where, for example, only one or multiple layers of connector and/or packaging are required and/or different shapes and/or compositions of the connectors and/ or packaging are required.

For example, a patch cord (e.g., optical fiber with connectors on both ends) and/or pigtail (e.g., a one-ended connector patch cord) can be produced by the process described herein by using, for example, the grippers to spool the optical fiber into the spooling tray for a predetermined length. The spooled optical fiber may then be connectorized via the gripper and/or transport device described above.

In addition, an optical amplifier (e.g., an erbium-doped fiberoptic amplifier (EDFA)) can also be produced in accordance with the apparatus and/or process described herein. A standard optical amplifier comprises a long, usually coiled, length of doped optical fiber with rare earth elements, with a WDM(s) connected to one or both sides of the doped optical fiber. An optional coupler(s) and possibly other components may also be attached to the doped optical fiber and/or WDM(s). The optical fiber loop or coiled section and/or connections for the optical amplifier can be generated using, for example, the grippers and/or transport device described above.

For example, the grippers can be used to spool the optical fiber into the spooling tray for a predetermined length. The gripper(s) and/or transport device(s) may also be used to position one or more ends of the optical amplifier or some part and/or component and/or portion thereof, for connection to one or more WDMs, optical couplers, and the like that may also be secured and/or transported and/or positioned or some portion(s) of them by gripper(s) and/or transport device(s). For example, the end of an optical fiber may be inserted into a ferrule as described in U.S. application Ser. No. 08/833,119, entitled "APPARATUS AND METHOD FOR CONTROLLED HEATING AND DEFORMING OF AN OPTIC FIBER," filed on Apr. 14, 1997, incorporated herein by reference, for connection to a connection device, for connection to another optical fiber.

The transport device may also be used to package the fiber optic device to facilitate the insertion and/or assembly of the fiber optic device into a subsequent device and/or larger assembly. In this example, the transport device functions as a package for stabilizing the fiber optic device, as well as a guidance and/or reference system to facilitate the insertion of the fiber optic device into the larger assembly. Accordingly, the combination of the fiber optic device and the transport device form a modularized-like kit that is a separate article of manufacture.

This combination of the transport device and fiber optic device may also be used, for example, with a standard pick-and-place machine such as used to position semiconductor chips, and/or automatic fusion splicer, and/or automatic cleaver, and/or automatic stripper, as described above in connection with, for example, the testing apparatus. One example of such a pick-and-place machine used in the semiconductor industry which I have determined may be easily modified to be of suitable structure and/or operation for the apparatus and/or process described herein is the SIPLACE™ 80 S-20 manufactured by Siemens Energy & Automation, Inc. Accordingly, an automatic "circuit boarding" or attaching function may be provided, for example, to attach fiber optic devices to each other and create a combination fiber optic device.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A system for automated production of a fiber optic device, comprising:
    at least one gripping device including a cavity adapted for receiving the at least one optical fiber therethrough and for securing thereto, said at least one gripping device adapted to transport the at least one optical fiber and to connect at least one end of the at least one optical fiber to a connector device facilitating connection of the at least one optical fiber to at least one of another optical fiber and another fiber optic device while maintaining information regarding, and control over, location of at least one of the at least one optical fiber and the at least one end of the at least one optical fiber to perform the automated production of the fiber optic device;

at least one collecting device, adapted to receive and collect a predetermined amount of the at least one optical fiber responsive to operation of said at least one gripping device;

a fusion splicing device to manually or automatically fusion splice at least one of the fiber optic device and the at least one optical fiber during the production of the fiber optic device;

a stripping device to manually or automatically strip at least one section of the at least one optical fiber during the production of the fiber optic device;

a cleaving device to manually or automatically cleave at least one section of the at least one optical fiber during the production of the fiber optic device;

a testing device to manually or automatically test optical characteristics of the fiber optic device during the production of the fiber optic device;

a labeling device to manually or automatically label the fiber optic device subsequent to the production of the fiber optic device for subsequent shipping to a customer;

a packaging device to manually or automatically package the fiber optic device in packaging for shipping to a customer; and a shipping device to manually or automatically ship the fiber optic device during the production of the fiber optic device to a customer, and wherein said apparatus transports the at least one fiber optic device for connection to at least one of said fusion splicing) stripping, cleaving, testing, labeling packaging and shipping devices.

2. A system for automated production of a fiber optic device according to claim 1, wherein the optical fiber device comprises at least one of a coupler, a fiber optic coupler, a fused biconical tapered (FBT) coupler, a switch, an optical switch, a wave-division multiplexer (WDM), a filter, an attenuator, a polarizer, a waveguide, a sensor, a fiber optic sensor, a connector, a fiber optic connector, a pigtail, a fiber optic pigtail, a patch cord, a fiber optic patch cord, a transmitter, a fiber optic transmitter, a receiver, a fiber optic receiver, an amplifier, an optical amplifier, a fiber optic amplifier.

3. A system for automated production of a fiber optic device according to claim 1, wherein said gripping device is adapted to receive the at least one optical fiber and to produce at least one optical fiber lead by de-spooling the predetermined amount of the at least one optical fiber from at least one optical fiber spool and storing the predetermined amount in said at least one collecting device.

4. A system for automated production of a fiber optic device according to claim 1, further comprising:

at least one movable holding stage including at least one clamp securable to the at least one optical fiber;

at least one energy source and applying energy to the at least one optical fiber;

at least one transport device adapted to transport the at least one optical fiber from said at least one gripping device to said at least one movable holding stage to receive the energy applied by said at least one energy source while maintaining location of at least one of the at least one optical fiber and an end of the at least one optical fiber to perform the automated production of the fiber optic device.

5. A system for automated production of a fiber optic device according to claim 4, wherein said at least one transport device is adapted to transport the at least one optical fiber from said at least one gripping device to said at least one movable holding stage and is removable therefrom when the energy is applied by said at least one energy source.

6. A system for automated production of a fiber optic device according to claim 1, further comprising at least one de-spooling mechanism de-spooling the at least optical fiber for input to the system and securing by said at least one gripping device.

7. A system for automated production of a fiber optic device according to claim 1, wherein the at least one optical fiber includes first and second ends, and wherein said system further comprises:

at least one optical source connected to the first end of the at least one optical fiber; and at least one detector connected to the second end of the at least one optical fiber.

8. A system for automated production of a fiber optic device according to claim 7, further comprising at least one controller controlling movement of the at least one optical fiber responsive to output of said detector.

9. A system for automated production of a fiber optic device according to claim 1, further comprising at least one controller responsively connected to said at least one gripping device, said at least one controller controlling transport of the at least one optical fiber via control of said at least one gripping device.

* * * * *